(12) United States Patent
Murphy et al.

(10) Patent No.: US 12,465,654 B2
(45) Date of Patent: Nov. 11, 2025

(54) MINERAL COATED MICROPARTICLES FOR SUSTAINED DELIVERY OF BIOLOGICALLY ACTIVE MOLECULES

(71) Applicant: Wisconsin Alumni Research Foundation, Madison, WI (US)

(72) Inventors: William L. Murphy, Waunakee, WI (US); Anna Clements, Madison, WI (US); Connie Chamberlain, Monona, WI (US); Ray Vanderby, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 16/500,017

(22) PCT Filed: Apr. 3, 2018

(86) PCT No.: PCT/US2018/025913
§ 371 (c)(1),
(2) Date: Oct. 1, 2019

(87) PCT Pub. No.: WO2018/187344
PCT Pub. Date: Oct. 11, 2018

(65) Prior Publication Data
US 2020/0164087 A1 May 28, 2020

Related U.S. Application Data

(60) Provisional application No. 62/480,710, filed on Apr. 3, 2017.

(51) Int. Cl.
*A61K 47/69* (2017.01)
*A61K 9/16* (2006.01)

(52) U.S. Cl.
CPC ........ *A61K 47/6923* (2017.08); *A61K 9/1611* (2013.01); *A61K 9/167* (2013.01); *A61K 47/6927* (2017.08)

(58) Field of Classification Search
CPC .............. A61K 2300/00; A61K 31/192; A61K 31/196; A61K 9/0019; A61K 9/0024; A61K 9/06; A61K 9/1647; A61K 38/00; A61K 38/1858; A61K 8/062; A61K 8/31; A61K 8/342; A61K 8/731; A61K 8/8152; A61K 8/86; A61K 8/891; A61K 8/892; A61K 8/895; A61K 9/0063; A61K 9/5031; A61K 47/60; A61K 45/06; A61K 9/0004; A61K 9/2886; A61K 9/2866; A61K 9/2027; A61K 31/549; A61K 9/28; A61K 9/5047; A61K 38/363; A61K 38/38; A61K 9/2086; A61K 9/501; A61K 31/485; A61K 2800/624; A61K 31/155; A61K 9/2013; A61K 9/2081; A61K 2800/621; A61K 47/32; A61K 9/0009; A61K 9/0014; A61K 9/5015; A61K 2800/81; A61K 47/44; A61K 8/0245; A61K 9/009; A61K 9/1635; A61K 9/4866; A61K 9/5021; A61K 31/4745; A61K 33/00; A61K 9/1676; A61K 9/2018; A61K 47/6927; A61K 9/107; A61K 9/284; A61K 31/14; A61K 31/327; A61K 33/40; A61K 38/1875; A61K 8/0241; A61K 8/064; A61K 9/1611; A61K 9/5073; A61K 2800/31; A61K 2800/654; A61K 31/202; A61K 31/315; A61K 31/44; A61K 31/496; A61K 31/5517; A61K 31/785; A61K 8/042; A61K 8/676; A61K 9/167; A61K 9/1682; A61K 2039/505; A61K 2039/507; A61K 2800/58; A61K 2800/592; A61K 2800/623; A61K 2800/651; A61K 31/122; A61K 31/185; A61K 31/337; A61K 31/366; A61K 31/4409; A61K 31/4965; A61K 31/5415; A61K 31/554; A61K 31/573; A61K 31/7076; A61K 36/73; A61K 36/9068; A61K 47/6903; A61K 47/6935; A61K 8/025; A61K 8/0279; A61K 8/19;
(Continued)

(56) References Cited

U.S. PATENT DOCUMENTS 6,599,873 B1 7/2003 Sommer et al.
10,780,054 B2 9/2020 Ketterer et al.
(Continued)

FOREIGN PATENT DOCUMENTS

| JP | 2011508788 A | 3/2011 |
| WO | 2008041704 A1 | 4/2008 |
| WO | 2009129149 A1 | 10/2009 |

OTHER PUBLICATIONS

Yu, X et al. Multilayered Inorganic Microparticles for Tunable Dual Growth Factor Delivery, Advanced Functional Materials, May 28, 2014; vol. 24, No. 20, pp. 1-22. (Year: 2014).*
(Continued)

*Primary Examiner* — Audrea B Coniglio
(74) *Attorney, Agent, or Firm* — Quarles & Brady, LLP

(57) ABSTRACT

Disclosed are formulations for providing an active agent. Formulations include a carrier including an active agent and mineral coated microparticles wherein an active agent is adsorbed to the mineral. Other formulations include a carrier including mineral coated microparticles wherein mineral coated microparticles include an active agent. Also disclosed are methods for sustained delivery of an active agent and methods for treating inflammatory diseases using a formulation for providing sustained delivery of an active agent.

21 Claims, 26 Drawing Sheets

(58) Field of Classification Search
CPC .......... A61K 8/34; A61K 8/37; A61K 8/375; A61K 8/411; A61K 8/70; A61K 8/73; A61K 8/88; A61K 8/90; A61K 9/0036; A61K 9/0051; A61K 9/0056; A61K 9/0085; A61K 9/0095; A61K 9/02; A61K 9/122; A61K 9/145; A61K 9/1617; A61K 9/1694; A61K 9/2077; A61K 9/288; A61K 9/48; A61K 9/4858; A61K 9/4891; A61K 9/50; A61K 9/5052; A61K 9/5057; A61K 9/5089; A61K 9/5153; A61K 9/7007; A61K 9/7084; A61K 9/454; A61K 31/5073; A61K 38/1793; A61K 9/08; A61K 39/3955; A61K 2039/545; A61K 39/395; A61K 47/26; A61K 47/183; A61K 2039/55; A61K 39/39591; A61K 2039/54; A61K 47/22; A61K 31/519; A61K 9/19; A61K 9/0048; A61K 31/4174; A61K 47/02; A61K 47/10; A61K 9/0053; A61K 38/465; A61K 38/2006; A61K 47/20; A61K 47/6845; A61K 38/17; A61K 38/1709; A61K 38/20; A61K 39/00; A61K 39/39533; A61K 45/00; A61K 2039/70; A61K 31/00; A61K 31/137; A61K 31/167; A61K 31/4172; A61K 31/42; A61K 31/4402; A61K 31/4706; A61K 31/506; A61K 31/5377; A61K 31/541; A61K 31/56; A61K 31/569; A61K 31/58; A61K 31/635; A61K 38/13; A61K 38/18; A61K 39/39558; A61K 47/42; A61K 47/50; A61K 47/59; A61K 47/6801; A61K 47/6843; A61K 47/6849; A61K 47/6879; A61K 47/6883; A61K 48/00; A61K 49/00; A61K 51/1021; A61K 9/00; A61P 29/00; A61P 19/08; A61P 19/04; A61P 19/00; A61P 1/02; A61P 19/02; A61P 37/00; A61P 37/06; A61L 27/34; A61L 2430/02; A61L 27/58; A61L 2400/06; A61L 27/54; A61L 2300/414; A61L 2430/06; A61L 2430/10; A61L 2430/12; A61L 27/025; A61L 27/12; A61L 27/227; A61L 27/24; A61L 27/3604; A61L 27/365; A61L 27/3847; A61L 27/40; A61L 27/425; A61L 27/46; A61L 27/56; A61L 2300/402; A61L 2300/406; A61L 2300/412; A61L 2300/602; A61L 24/0015; A61L 24/0031; A61L 27/3834; A61L 27/52; C07K 14/54; C07K 16/18; C07K 14/47; C07K 14/49; C07K 14/545; C07K 14/715; C07K 16/245

See application file for complete search history.

(56) References Cited

U.S. PATENT DOCUMENTS

| 11,628,227 | B2 | 4/2023 | Murphy et al. |
| 2008/0188817 | A1* | 8/2008 | Dix .......................... A61P 43/00 604/259 |
| 2009/0111763 | A1* | 4/2009 | Fritz .................... C08G 79/025 514/44 R |
| 2010/0015049 | A1* | 1/2010 | Wohabrebbi ......... A61K 9/1647 424/1.65 |
| 2010/0143439 | A1* | 6/2010 | Jayasuriya .......... A61L 27/3834 424/423 |
| 2011/0014258 | A1 | 1/2011 | Gan et al. |
| 2014/0161886 | A1 | 6/2014 | Murphy et al. |
| 2016/0017368 | A1 | 1/2016 | Murphy et al. |
| 2016/0271296 | A1 | 9/2016 | Jongpaiboonkit et al. |
| 2017/0014481 | A1 | 1/2017 | Lynch et al. |
| 2019/0358344 | A1 | 11/2019 | Clements et al. |
| 2020/0164087 | A1 | 5/2020 | Murphy et al. |
| 2020/0170958 | A1 | 6/2020 | Murphy et al. |
| 2021/0106681 | A1 | 4/2021 | Duroux et al. |
| 2024/0325596 | A1 | 10/2024 | Choe et al. |

OTHER PUBLICATIONS

Yu et al. ("Multilayered Inorganic Microparticles for Tunable Dual Growth Factor Delivery"; Adv. Funct. Mater., 2014, vol. 24, No. 2, pp. 3082-3093 (Year: 2014).*

Goldbach-Mansky, R.; Blocking Interleukin-1 in Rheumatic Diseases: Its Initial Disappointments and Recent Successes in the Treatment of Autoinflammatory Diseases; Ann N Y Acad Sci., 2009, vol. 1182, pp. 111-123.

Yu et al., Multilayered Inorganic Microparticles for Tunable Dual Growth Factor Delivery; Adv Funct Mater, 2014, vol. 24, No. 20, pp. 3082-3093.

Beck, J. D. et al. mRNA therapeutics in cancer immunotherapy. Mol. Cancer 20, 69 (2021).

Choi, S. & Murphy, W. L. Sustained plasmid DNA release from dissolving mineral coatings. Acta Biomater. 6, 3426-3435 (2010).

Clements, A. E. B., Groves, E. R., Chamberlain, C. S., Vanderby, R. & Murphy, W. L. Microparticles Locally Deliver Active Interleukin-1 Receptor Antagonist In Vivo. Adv. Healthc. Mater. 7, 1800263 (2018).

Haabeth, O. A. W. et al. Local Delivery of Ox40l, Cd80, and Cd86 mRNA Kindles Global Anticancer Immunity. Cancer Res. 79, 1624-1634 (2019).

* cited by examiner

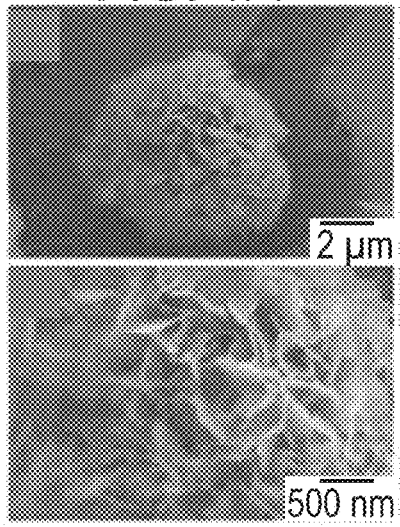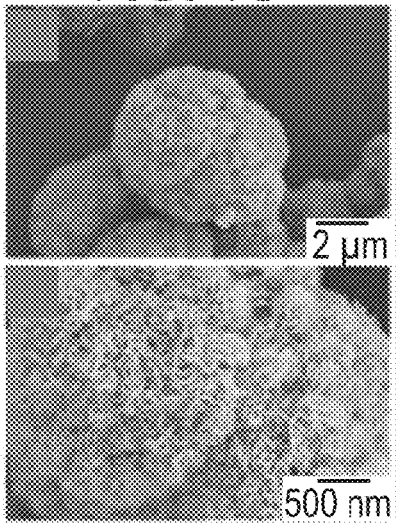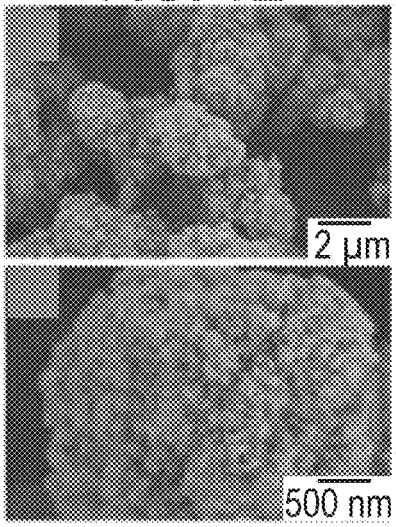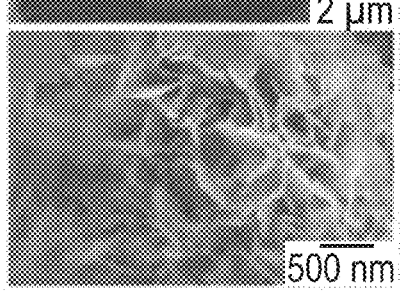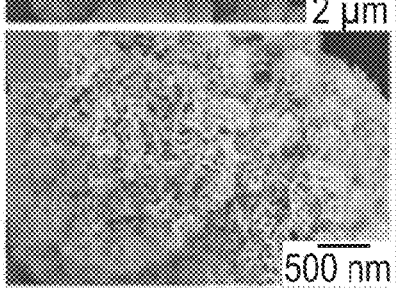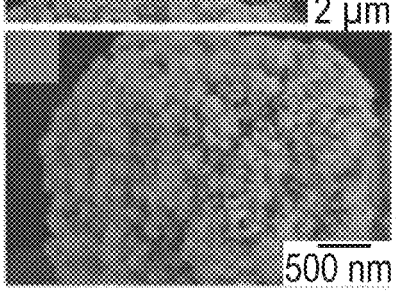
FIG. 1A FIG. 1C FIG. 1E
FIG. 1B FIG. 1D FIG. 1F 7 Days Post Transection    21 Days Post Transection

MINERAL COATED MICROPARTICLES FOR SUSTAINED DELIVERY OF BIOLOGICALLY ACTIVE MOLECULES

CROSS REFERENCE TO RELATED APPLICATIONS

This application is a national phase application based on International Application No. PCT/US2018/025913, filed Apr. 3, 2018, which claims priority to U.S. Provisional Application No. 62/480,710, filed on Apr. 3, 2017, each disclosure of which is hereby incorporated by reference in its entirety.

STATEMENT REGARDING FEDERALLY SPONSORED RESEARCH OR DEVELOPMENT

This invention was made with government support under HL093282 awarded by the National Institutes of Health. The government has certain rights in the invention.

BACKGROUND

The present disclosure is directed to formulations for providing an active agent. Formulations include a carrier including an active agent and mineral coated microparticles wherein an active agent is adsorbed to the mineral coating. Also disclosed are methods for sustained delivery of an active agent and methods for treating inflammatory diseases using a formulation for providing sustained delivery of an active agent.

Delivery strategies for active agents include localized delivery and sustained delivery strategies. In localized delivery, the active agent is only active at the site of interest and limits the effect on regions outside of the site of interest. Encapsulation in a carrier system (gels, scaffolds, microparticles), for example, is utilized for localized delivery, where the agent acts locally but limits the amount of the agent which goes into circulation. Sustained delivery systems delivery utilizes various platforms to maintain therapeutic concentrations ranges, either systemically or locally, by controllably releasing the agent over time. Strategies for sustained delivery which have been explored previously can result in an active agent having less activity, which requires larger doses to provide a therapeutic effect.

Osteoarthritis (OA) and rheumatoid arthritis (RA) are significant clinical problems. Arthritis is the leading cause of disability in the US, affecting more than 50 million people. Although OA costs are considerable, the patient's quality of life remains poor. In the US, RA has a prevalence of 1-2% with annual medical costs of $60,000 to $120,000 per US patient. Both are chronic and progressive and both involve inflammatory processes, but one difference between the two conditions is that OA is thought to be localized while RA is considered a systemic disease. OA frequently leads to joint replacement, while ⅓ of RA patients become severely disabled. Arthritis degrades articular cartilage, the tissue protecting bones in diarthrodial joints from concentrated load-bearing forces and motion-induced friction. Articular cartilage possesses limited regeneration capabilities. Once damaged, a positive feedback loop releases matrix proteases that produce molecular products to drive the chronic pathogenesis. Endogenous signaling is enhanced via upregulation of inflammatory signals in the synovium including tumor necrosis factor α (TNF-α), interleukin-1 (IL-1), interleukin-6 (IL-6) and interferon-α (IFN-α).

Currently, few therapeutics are available to treat OA other than nonsteroidal anti-inflammatories. Prior to joint replacement, various surgical procedures can be used to promote cartilage repair. These provide temporary relief, but result in repair tissue that is poorly organized, mechanically inferior, and breaks down with time. For RA, Methotrexate is commonly used, but 50% of patients fail this treatment. TNF inhibitors are then prescribed. They are costly and still fail many patients. For both OA and RA patients, IL-1 inhibitors have shown great promise and may fill an important treatment gap. However, maintaining therapeutic concentrations in vivo through sustained delivery is a formidable problem which may limit its clinical use. Gene delivery is a new strategy for sustained levels of an IL-1 inhibitor. This concept, while scientifically appealing, requires harvesting autologous synovial cells, virally transfecting them to over express IL-Ra, and re-implanting them into a patient's synovial joint which raises concerns regarding clinical feasibility and safety.

Interleukin-1 (IL-1) is a major mediator of inflammation in many inflammatory situations, including chronic inflammatory conditions (such as rheumatoid arthritis, osteoarthritis, and type 2 diabetes mellitus), neuropathological diseases (such as stroke, Alzheimer's disease, Parkinson's disease, and epilepsy), and more local inflammatory situations (such as cutaneous and ligament wound healing). When Interleukin-1 interacts with its receptor pro-inflammatory signaling cascades are initiated in a variety of cell types, including lymphocytes, endothelial cells, macrophages, fibroblasts, and chondrocytes. Interleukin-1 receptor antagonist (IL-Ra) is a naturally occurring antagonist of pro-inflammatory interleukin-1 (IL-1) induced inflammation which binds to the IL-1 receptor but does not initiate an inflammatory cascade. A recombinant form of IL-Ra is clinically approved for treating Rheumatoid Arthritis. It has also been used off-label for other clinical indications. IL-Ra possesses unique and desirable properties which make it an ideal candidate to control inflammation, including its high binding affinity and target specificity with the IL-1 receptor, its low toxicity, and its low molecular weight (17 kD) when compared to other potential therapeutic proteins. It has been investigated as a possible treatment strategy for many of the inflammatory situations associated with IL-1 expression.

The short in vivo half-life (4-6 hours) and high doses (1 mg/kg) of IL-Ra required to inhibit IL-1 activity are challenges that have limited the effectiveness of IL-Ra treatment for many conditions and have created onerous treatment regiments such as daily subcutaneous injections of high doses (100 mg). Delivery strategies have been developed previously to prolong the half-life of IL-Ra, including fusion of IL-Ra with different protein and peptide partners. Fusion of IL-Ra with protein and peptide partners lengthens its in vivo half-life by preventing enzymatic degradation and renal filtration. While fusion with other peptide partners has improved the half-life of IL-Ra, up to 20× longer, the activity of some fusions is 100-500 fold lower than IL-Ra. Researchers have also fused IL-Ra with polyethylene glycol (PEG) to PEGylate IL-Ra and prolong its half-life. After PEGylation, IL-Ra-PEG exhibited significantly decreased binding activity with the IL-1 receptor. While alterations to IL-Ra structure have succeeded in improving the half-life of IL-Ra, the altercation of IL-Ra structure and interference with IL-1 receptor binding may limit their use in clinic. Besides fusion of IL-Ra with other molecules, researchers have also attempted to deliver IL-Ra in a sustained and localized manner by encapsulating IL-Ra in poly (lactic-co-glycolic) acid microspheres. When PLGA microspheres were administered via subcutaneous injection in BALB/c mice, serum levels of IL-Ra remain elevated for 8 days, a significant increase when compared to bolus subcutaneous injection of IL-Ra in which no IL-Ra was detectable after 24 hours. However, in the same study it was also shown that the biological activity of IL-Ra was greatly impaired during the encapsulation process and it was estimated that only 6% of entrapped IL-Ra remained biologically active. Encapsulation in polymer microspheres is often detrimental to protein biological activity because of the harsh processing environments, use of solvents which are required for encapsulation, and protein aggregation caused by dense protein packing.

The strategies to prolong the benefit of active agents having short half-lives have resulted in reduced activity and/or required higher doses. Accordingly, there exists a need for alternative delivery systems that can provide sustained delivery and/or local delivery of biologically active molecules.

BRIEF DESCRIPTION

In one aspect, the present disclosure is directed to a formulation for providing an active agent. The formulation includes a carrier wherein the carrier comprises at least a first active agent; and a mineral coated microparticle comprising a mineral coating; and at least a second active agent. In one embodiment, the second active agent is adsorbed to the mineral. In one embodiment, the second active agent is incorporated within the mineral. In one embodiment, the second active agent is both adsorbed to the mineral and incorporated within the mineral.

In one aspect, the present disclosure is directed to a formulation for providing an active agent. The formulation includes a carrier wherein the carrier comprises a mineral coated microparticle comprising an active agent adsorbed to the mineral.

In one aspect, the present disclosure is directed to a formulation for sustainably delivering an active agent. The formulation includes a solution with a first active agent; and a mineral coated microparticle added to the solution with the first active agent. In one embodiment, the active agent absorbs to the mineral coated microparticle upon addition in the solution containing the first active agent. In another embodiment, a second active agent is incorporated within the mineral coated microparticle before it is added to the solution of the first active agent.

In one aspect, the present disclosure is directed to a mineral coated microparticle comprising an active agent. In one embodiment, the second active agent is adsorbed to the mineral. In one embodiment, the second active agent is incorporated within the mineral. In one embodiment, the second active agent is both adsorbed to the mineral and incorporated within the mineral.

In one aspect, the present disclosure is directed to a mineral coated microparticle, the mineral coated microparticle comprising a layered mineral coating and at least one active agent adsorbed onto at least one layer of the mineral coating.

In one aspect, the present disclosure is directed to a method for immediate and sustained delivery of an active agent. The method includes providing a formulation to an individual in need thereof, the formulation including a carrier wherein the carrier comprises at least a first active agent; and a mineral coated microparticle comprising a mineral coating; and at least a second active agent. In one embodiment, the second active agent is adsorbed to the mineral. In one embodiment, the second active agent is incorporated within the mineral. In one embodiment, the second active agent is both adsorbed to the mineral and incorporated within the mineral.

In one aspect, the present disclosure is directed to a method for treating an inflammatory disease in a subject in need thereof. The method includes administering a formulation to the subject, wherein the formulation comprises a carrier, wherein the carrier comprises at least a first active agent; and a mineral coated microparticle comprising a mineral coating; and at least a second active agent. In one embodiment, the second active agent is adsorbed to the mineral. In one embodiment, the second active agent is incorporated within the mineral. In one embodiment, the second active agent is both adsorbed to the mineral and incorporated within the mineral.

In another aspect, the present disclosure is directed to a method for treating post-surgery inflammation in a subject in need thereof. The method includes administering a formulation to the subject, wherein the formulation includes a carrier that includes an active agent and a mineral coated microparticle, wherein the mineral coated microparticle comprises an active agent.

BRIEF DESCRIPTION OF THE DRAWINGS

FIG. 1A is a low magnification SEM showing a plate-like morphology of mineral coated microparticles formed in 4.2 mM (low) carbonate modified simulated body fluid (mSBF). FIG. 1B is a high magnification SEM showing a plate-like morphology of mineral coated microparticles formed in 4.2 mM (low) carbonate mSBF. FIG. 1C is a low magnification SEM showing a spherulite-like morphology of mineral coated microparticles formed in 25 mM (mid) carbonate mSBF. FIG. 1D is a high magnification SEM showing a spherulite-like morphology of mineral coated microparticles formed in 25 mM (mid) carbonate mSBF. FIG. 1E is a low magnification SEM showing a spherulite-like morphology of mineral coated microparticles formed in 100 mM (high) carbonate mSBF. FIG. 1F is a high magnification SEM showing a spherulite-like morphology of mineral coated microparticles formed in 100 mM (high) carbonate mSBF.

FIG. 10A is a schematic of IL-Ra fabrication which involves the addition of microparticles to a solution containing IL-Ra and subsequent incubation for 1 hour. FIG. 10B depicts that the mass of IL-Ra bound per mg of MP decreased when incubated in decreasing concentrations of IL-Ra during loading. FIG. 10C depicts that the binding efficiency of IL-Ra to MPs increased with decreasing concentrations of IL-Ra during loading. FIG. 10D shows that cumulative release of IL-Ra from MPs in simulated body fluid over 14 days showed sustained release for at least 14 days. Data represent mean±standard error.

FIG. 11A shows that cell concentration was increased after D10.G4.1 mouse T-lymphocytes were treated with IL-1, and unloaded MPs did not impact the IL-1 induced increase in cell concentration. FIG. 11B shows that IL-Ra MPs significantly reduced the cell concentration after IL-1 stimulated of D10.G4.1 mouse T-lymphocytes when compared to cells treated with soluble IL-Ra or PBS. FIG. 11C depicts that the concentration of IL-Ra in the D10.G4.1 mouse T-lymphocytes culture media was significantly higher in media treated with soluble IL-Ra when compared to IL-Ra MPs and was undetectable in PBS treated media. FIG. 11D is a schematic of THP-1 culture with unloaded MPs or IL-Ra MPs in a transwell cell culture system. IL-1 was added to the culture media 6 hours after treatment. FIG. 11E depicts that treatment with IL-Ra MPs significantly decreased the media concentration of IL-6 at 18 and 30 hours after treatment in IL-1 stimulated THP-1 cell cultures when compared to unloaded MPs. Data represent mean±standard deviation. Different letters represent significant differences between groups (ANOVA, p<0.05), * represents significant difference between compared treatments (Student T-Test, p<0.05).

FIG. 12A is a schematic of IL-Ra MP in vivo treatments, which involves the addition of microparticles to a solution of IL-Ra which is then injected. FIG. 12B depicts that the concentration of IL-Ra in serum collected 1, 3, 5, 7, and 14 days after treatment remained elevated for 14 days. FIG. 12C shows that serum IL-6 normalized to the serum concentration of IL-6 in PBS treated animals collected 2 hours after IL-1 stimulation. Values lower than 1 represent a decrease in IL-1 induced serum IL-6. Different letters represent significant differences between groups p<0.05); * represents a significant difference (p<0.05) between treatment and PBS control. N. D. represents Not Detectable.

FIG. 13A is a schematic of layered IL-Ra MP fabrication. FIG. 13B shows that layered IL-Ra MPs bound more IL-Ra per mg of MP than IL-Ra MPs. FIG. 13C shows that layered IL-Ra MPs released a lower percent of the loaded IL-Ra after 1 day when compared to IL-Ra MPs and release IL-Ra in a sustained manner for at least 14 days. FIG. 13D shows that layered IL-Ra MPs elevated serum IL-Ra to above detectable levels for 10 days. FIG. 13E shows that layered IL-Ra MPs reduced serum IL-6 concentration compared to PBS control after IL-1 stimulation for at least 14 days.

FIG. 14A shows SEM of uncoated B-TCP core materials at lower (top) and higher (bottom) magnification. FIG. 14B shows SEM of microparticles after 7 days of coating in mSBF at lower (top) and higher (bottom) magnification. FIG. 14C is a schematic of microparticle coating formation and IL-Ra loading.

FIG. 15A depicts tissue concentration of IL-Ra in homogenized MCLs. FIG. 15B depicts serum concentration of IL-Ra. FIG. 15C depicts Alizarin Red staining of MPs within the MCL 7 and 14 days after treatment. Graphs represent mean±standard error, * represents p<0.05 between soluble IL-Ra and IL-Ra MP, ** represents p<0.05 between day 7 IL-Ra MP and day 14 IL-Ra MP, N. D. represents "not detectible".

FIG. 16A depicts M1 macrophage concentration within the granulation tissue of MCLs 7 days (darker bars) and 14 days (light bars) after injury. Graph represent mean±standard error, * represents p<0.05 compared to PBS treated control. FIG. 16B depicts ED1 stained M1 macrophages (brown) within the MCL granulation tissue 7 days and 14 days after injury. Scale bar represents 100 µm. FIG. 16C depicts ED1 stained M1 macrophages around unloaded and IL-Ra MPs 7 and 14 days after injury. Scale bar represents 20 µm.

FIG. 17A depicts the concentration of IL-1a and FIG. 17B depicts the concentration of IL-1β 7 and 14 days after treatment normalized to total protein concentration. Graphs represent mean±standard error, * represents p<0.05 while # represents p<0.15 between indicated groups.

FIG. 18A depicts H&E staining of MCL sections 7 and 14 days after injury. Scale bars represent 500 µm. FIG. 18B depicts T-lymphocyte concentration within the granulation tissue 7 and 14 days after injury. Graph represent mean±standard error, * represents p<0.05 between indicated groups. FIG. 18C depicts H&E staining of tissue surrounding microparticles. Scale bars represent 100 µm.

DETAILED DESCRIPTION

Figure 1G:
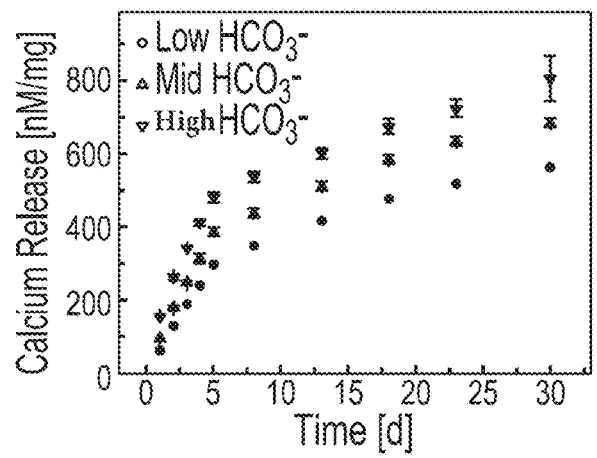
FIG. 1G is a graph depicting calcium release by mineral coated microparticles formed with low $HCO_3^-$mSBF (●), mid $HCO_3^-$mSBF (▲), and high $HCO_3^-$mSBF (▼).
Figure 1H:
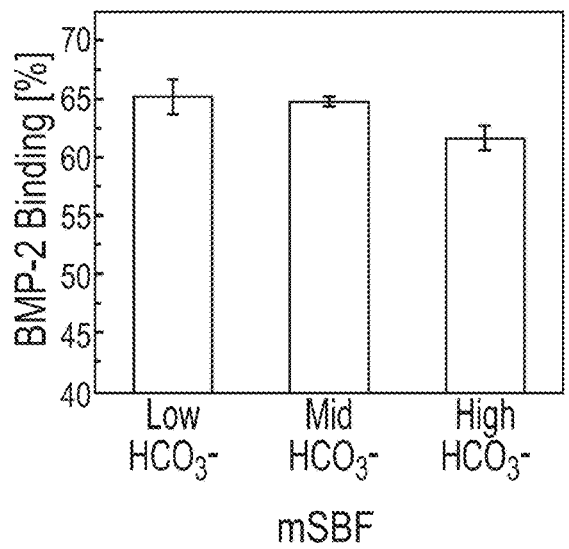
FIG. 1H is a graph depicting BMP-2 binding to mineral coated microparticles formed with low $HCO_3^-$mSBF, mid $HCO_3^-$mSBF, and high $HCO_3^-$mSBF.
Figure 1I:
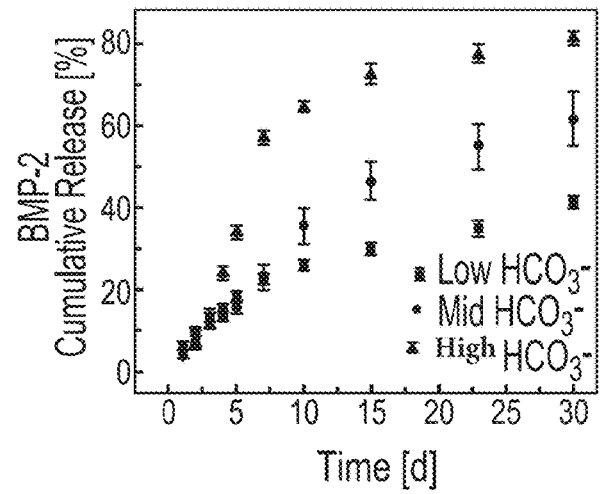
FIG. 1I is a graph depicting release of BMP-2 from mineral coated microparticles formed with low $HCO_3^-$mSBF (■), mid $HCO_3^-$mSBF (●), and high $HCO_3^-$mSBF (▲).

The present disclosure is directed to formulations for providing an active agent. In some embodiments, formulations include a carrier including an active agent and mineral coated microparticles wherein an active agent is adsorbed to the mineral coating. In some embodiments, formulations include a carrier including an active agent and mineral coated microparticles wherein an active agent is incorporated within the mineral coating. In some embodiments, formulations include a carrier including an active agent and mineral coated microparticles wherein an active agent is incorporated within the mineral coating and wherein an active agent is adsorbed to the mineral coating. Active agents included in the carrier provide a rapid effect following administration whereas active agent adsorbed to the mineral coating and/or incorporated within the mineral coating provides a sustained delivery as the mineral coating degrades. Also disclosed are methods for sustained delivery of an active agent and methods for treating inflammatory diseases using a formulation for providing sustained delivery of an active agent.

In one aspect, the present disclosure is directed to a formulation for providing an active agent.

In one embodiment, the formulation includes a carrier wherein the carrier comprises an active agent and a mineral coated microparticle, wherein the mineral coated microparticle comprises a core; a mineral coating on the core; and an active agent adsorbed to the mineral coating.

In one embodiment, the formulation includes a carrier wherein the carrier comprises an active agent and a mineral coated microparticle, wherein the mineral coated microparticle comprises a core; a mineral coating on the core; and an active agent within the mineral coating.

In one embodiment, the formulation includes a carrier wherein the carrier comprises an active agent and a mineral coated microparticle, wherein the mineral coated microparticle comprises a core; a mineral coating on the core; and at least one active agent within the mineral coating and at least one active agent adsorbed to the mineral coating.

In one embodiment, the formulation includes a carrier wherein the carrier comprises an active agent and a mineral coated microparticle, wherein the mineral coated microparticle comprises a core, a first layer of mineral coating on the core, an active agent adsorbed onto the first layer of mineral coating, a second layer of mineral coating and a second active agent absorbed to the second layer of mineral coating.

In one embodiment, the formulation includes a carrier wherein the carrier comprises an active agent and a mineral coated microparticle, wherein the mineral coated microparticle comprises a core, a plurality of layers of mineral coating, and active agents. The layers of mineral coating can be the same coating formulations as described herein. The layers of mineral coating can also be different coating formulations as described herein. The active agents can be absorbed onto the layers of mineral coating after each layer of mineral coating is prepared as described herein. The active agents can be incorporated within the layers of mineral coating during mineral formation as described herein. The active agents can be the same active agent as described herein. The active agents can be different active agents as described herein.

The term formulation, as used herein, generically indicates the beneficial agent and mineral coated microparticles are formulated, mixed, added, dissolved, suspended, solubilized, formulated into a solution, carried and/or the like in or by the fluid in a physical-chemical form acceptable for parenteral administration.

In one embodiment, the active agent adsorbed to the mineral coating is the same as the active agent in the carrier. In another embodiment, the active agent adsorbed to the mineral coating is different from the active agent in the carrier. In another aspect, at least two different active agents are adsorbed to the mineral coating. Contemplated embodiments further include 3, 4, 5 or more different active agents adsorbed to the mineral coating. In one embodiment, the active agent incorporated within the mineral coating is the same as the active agent in the carrier. In another embodiment, the active agent incorporated within the mineral coating is different from the active agent in the carrier. In another aspect, at least two different active agents are incorporated within the mineral coating. Contemplated embodiments further include 3, 4, 5 or more different active agents incorporated within the mineral coating. In another aspect, an active agent can be incorporated within the mineral coating in combination with an active agent adsorbed to the mineral coating. Formulations include 3, 4, 5 or more different active agents in the carrier solution.

Particularly suitable active agents can be an IL-1 antagonist; an IL-1 receptor antagonist; abatacept; rituximab; tocilizumab; anakinra; adalimumab; etanercept; infliximab; certolizumab; golimumab; and combinations thereof. A particularly suitable IL-1 antagonist is a recombinant IL-1 antagonist. Abatacept is a fusion protein composed of the extracellular domain of CTLA-4 with the hinge, CH2, and CH3 domains of IgG1 and currently approved for use in people with rheumatoid arthritis. Rituximab is a monoclonal antibody against the protein CD20, which is primarily found on the surface of immune system B cells and used to treat autoimmune diseases and types of cancer. Rituximab is also approved for use in combination with methotrexate (MTX) for reducing signs and symptoms in adult patients with moderately to severely active rheumatoid arthritis (RA). Tocilizumab is an immunosuppressive drug, mainly for the treatment of rheumatoid arthritis (RA) and systemic juvenile idiopathic arthritis, a severe form of arthritis in children. It is a humanized monoclonal antibody against the interleukin-6 receptor (IL-6R). Anakinra is an interleukin 1 (IL1) receptor antagonist used to treat rheumatoid arthritis. Adalimumab is a TNF-inhibiting, anti-inflammatory monoclonal antibody used to treat rheumatoid arthritis, psoriatic arthritis, ankylosing spondylitis, Crohn's disease, ulcerative colitis, chronic psoriasis, hidradenitis suppurativa, and juvenile idiopathic arthritis. Etanercept is a fusion protein of the TNF receptor and the constant end of the IgG1 antibody that inhibits TNF and is used to treat rheumatoid arthritis, juvenile rheumatoid arthritis and psoriatic arthritis, plaque psoriasis and ankylosing spondylitis. Infliximab is a chimeric monoclonal antibody that binds to TNF-α and is used to treat Crohn's disease, ulcerative colitis, psoriasis, psoriatic arthritis, ankylosing spondylitis, and rheumatoid arthritis. Certolizumab (and Certolizumab pegol a PEGylated Fab' fragment of a humanized TNF inhibitor monoclonal antibody) is a fragment of a monoclonal antibody specific to tumor necrosis factor alpha (TNF-α) and is used to treat Crohn's disease, rheumatoid arthritis, psoriatic arthritis and ankylosing spondylitis. Golimumab is a human monoclonal antibody that targets tumor necrosis factor alpha (TNF-alpha), and hence is a TNF inhibitor, is used as a treatment for rheumatoid arthritis, psoriatic arthritis, ankylosing spondylitis, and ulcerative colitis.

Other suitable active agents can be antagonists of the IL-1 family of cytokines. The IL-1 family is a group of 11 cytokines that induces a complex network of proinflammatory cytokines and regulates and initiates inflammatory responses. The 11 cytokines includes IL-la (IL-1F1), IL1b (IL-1F2), IL-Ra (IL-1F3), IL-18 (IL-1F4), IL-36Ra (IL-1F5), IL-36α (IL-1F6), IL-37 (IL-1F7), IL-36β (IL-1F8), IL36γ (IL-1F9), IL-38 (IL-1F10), and IL-33 (IL-1F11).

Other suitable active agents can be antagonists of the interleukin-1 receptor (IL-1R) family. The IL-1R receptor family is characterized by extracellular immunoglobulin-like domains and intracellular Toll/Interleukin-1R (TIR) domain. It is a group of structurally homologous proteins, conserved throughout the species as it was identified from plants to mammals. IL-1Rs are involved in immune host defense and hematopoiesis. Type I IL-1R (IL-1RI) (also known as CD121a) is receptor for IL-1α, IL-1β and IL-RA. IL-1R family members include IL-1R1, IL-18Rα, IL-Rrp2, and ST2. IL-1RII is predominantly expressed on lymphoid and myeloid cells. IL-1RII is a surface receptor able to bind IL-1α, IL-1β and IL-1RI and also forms a soluble form sIL-1RII.

When formulated in one formulation the unbound active agent contained in the carrier and the active agent adsorbed to the mineral coated microparticle have profiles of action that are identical or substantially identical to the profiles of action when the unbound active agent and the active agent adsorbed to the mineral coated microparticle are administered in separate formulations. Thus, the unbound active agent functions as a bolus administration with rapid or immediate profile of action whereas the bound active agent (adsorbed to the mineral coated microparticle) functions as a sustained release profile of action.

As used herein, an effective amount, a therapeutically effective amount, a prophylactically effective amount and a diagnostically effective amount is the amount of the unbound active agent and the active agent adsorbed to the mineral coated microparticle needed to elicit the desired biological response following administration.

Suitable carriers include water, saline, isotonic saline, phosphate buffered saline, Ringer's lactate, and the like.

Formulations can also include other components such as surfactants, preservatives, and excipients. Surfactants can reduce or prevent surface-induced aggregation of the active agent and the mineral coated microparticles. Various conventional surfactants can be employed, such as polyoxyethylene fatty acid esters and alcohols, and polyoxyethylene sorbitol fatty acid esters. Amounts will generally range from about 0.001 and about 4% by weight of the formulation. Pharmaceutically acceptable preservatives include, for example, phenol, o-cresol, m-cresol, p-cresol, methyl p-hydroxybenzoate, propyl p-hydroxybenzoate, 2-phenoxyethanol, butyl p-hydroxybenzoate, 2-phenylethanol, benzyl alcohol, chlorobutanol, and thiomerosal, bronopol, benzoic acid, imidurea, chlorohexidine, sodium dehydroacetate, chlorocresol, ethyl p-hydroxybenzoate, benzethonium chloride, chlorphenesine (3p-chlorphenoxypropane-1,2-diol) and mixtures thereof. The preservative can be present in concentrations ranging from about 0.1 mg/ml to about 20 mg/ml, including from about 0.1 mg/ml to about 10 mg/ml. The use of a preservative in pharmaceutical compositions is well-known to those skilled in the art. For convenience reference is made to Remington: The Science and Practice of Pharmacy, 19th edition, 1995. Formulations can include suitable buffers such as sodium acetate, glycylglycine, HEPES (4-(2-hydroxyethyl)-1-piperazineethanesulfonic acid) and sodium phosphate. Excipients include components for tonicity adjustment, antioxidants, and stabilizers as commonly used in the preparation of pharmaceutical formulations. Other inactive ingredients include, for example, L-histidine, L-histidine monohydrochloride monohydrate, sorbitol, polysorbate 80, sodium citrate, sodium chloride, and EDTA disodium.

Any suitable material can be used as the core upon which the mineral coating is formed. Particularly suitable core materials are those materials known to be non-toxic to humans and animals. Particularly suitable core materials also include those materials known to degrade and/or dissolve in humans and animals. Suitable core materials include β-tricalcium phosphate, hydroxyapatite, PLGA, and combinations thereof. β-tricalcium phosphate cores are particularly suitable as the β-tricalcium phosphate degrades. In other embodiments, the core material can be dissolved following mineral coating formation. In other embodiments, the core material is non-degradable.

The mineral coating includes calcium, phosphate, carbonate, and combinations thereof. To prepare a mineral coated microparticle a core material is incubated in a modified simulated body fluid. The modified simulated body fluid includes calcium and phosphate, which form the mineral coating on the surface of the core, which results in the mineral coated microparticle. Different mineral coating morphologies can be achieved by varying the amounts and ratios of calcium, phosphate, and carbonate. Different mineral coating morphologies include, for example, plate-like structure, spherulite-like structure. High carbonate concentration results in a mineral coating having a plate-like structure. Low carbonate concentration results in a mineral coating having a spherulite-like structure. The mineral coating morphology also affects adsorption of the active agent.

Suitable core materials on which the mineral coating is formed include polymers, ceramics, metals, glass and combinations thereof in the form of particles. Suitable particles can be, for example, agarose beads, latex beads, magnetic beads, polymer beads, ceramic beads, metal beads (including magnetic metal beads), glass beads and combinations thereof. The microparticle includes ceramics (e.g., hydroxyapatite, beta-tricalcium phosphate (beta-TCP, β-TCP), magnetite, neodymium), plastics (e.g., polystyrene, poly-caprolactone), hydrogels (e.g., polyethylene glycol; poly(lactic-co-glycolic acid), and the like, and combinations thereof. Particularly suitable core materials are those that dissolve in vivo such as, for example, beta-tricalcium phosphate (beta-TCP, β-TCP).

Suitable microparticle sizes can range from about 1 μm to about 100 μm in diameter. Microparticle diameter can be measured by methods known to those skilled in the art such as, for example, measurements taken from microscopic images (including light and electron microscopic images), filtration through a size-selection substrate, and the like.

The core substrates can initially be coated with a poly(α-hydroxy ester) film, for example. Particularly suitable poly (α-hydroxy esters) may be, for example, poly(L-lactide), poly(lactide-co-glycolide), poly(ε-caprolactone), and combinations thereof. It should be understood that when making any combinations of the above films, the films are typically mixed in suitable organic solvents as known in the art. Further, differences in molecular weights, crystallization rates, glass transition temperatures, viscosities, and the like should be taken into consideration as well as understood in the art to prevent phase separation and lack of uniformity in the final substrates. Phase separation and lack of uniformity can further be avoided by altering the mixing ratio of the films used in the substrate.

After preparing a poly(α-hydroxy ester) film on the substrate, the surface of the film coating is hydrolyzed under alkaline conditions to create a surface having COOH and OH groups. After surface hydrolyzing, the substrate is incubated in a simulated body fluid containing a suitable mineral-forming material to form a mineral coating. Suitable mineral-forming materials may be, for example, calcium, phosphate, carbonate, and combinations thereof.

The simulated body fluid (SBF) for use in the methods of the present disclosure typically includes from about 5 mM to about 12.5 mM calcium ions, including from about 7 mM to about 10 mM calcium ions, and including about 8.75 mM calcium ions; from about 2 mM to about 12.5 mM phosphate ions, including from about 2.5 mM to about 7 mM phosphate ions, and including from about 3.5 mM to about 5 mM phosphate ions; and from about 4 mM to about 100 mM carbonate ions.

In some embodiments, the SBF can include about 141 mM sodium chloride, about 4 mM potassium chloride, about 0.5 mM magnesium sulfate, about 1 mM magnesium chloride, about 5 mM calcium chloride, about 2 mM potassium phosphate, and about 4 mM sodium bicarbonate, and buffered to a pH of about 6.8.

In some embodiments, the SBF can further include about 145 mM sodium ions, from about 6 mM to about 9 mM potassium ions, about 1.5 mM magnesium ions, from about 150 mM to about 175 mM chloride ions, about 4 mM $HCO_3^-$, and about 0.5 mM $SO_4^{2-}$ ions.

The pH of the SBF can typically range from about 4 to about 7.5, including from about 5.3 to about 6.8, including from about 5.7 to about 6.2, and including from about 5.8 to about 6.1.

Suitable SBF can include, for example: about 145 mM sodium ions, about 6 mM to about 9 mM potassium ions, about 5 mM to about 12.5 mM calcium ions, about 1.5 mM magnesium ions, about 150 mM to about 175 mM chloride ions, about 4.2 mM $HCO_3^-$, about 2 mM to about 5 mM $HPO_4^{2-}$ ions, and about 0.5 mM $SO_4^{2-}$ ions. The pH of the simulated body fluid may be from about 5.3 to about 7.5, including from about 6 to about 6.8.

In one embodiment, the SBF may include, for example: about 145 mM sodium ions, about 6 mM to about 17 mM potassium ions, about 5 mM to about 12.5 mM calcium ions, about 1.5 mM magnesium ions, about 150 mM to about 175 mM chloride ions, about 4.2 mM to about 100 mM $HCO_3^-$, about 2 mM to about 12.5 mM phosphate ions, and about 0.5 mM $SO_4^{2-}$ ions. The pH of the simulated body fluid may be from about 5.3 to about 7.5, including from about 5.3 to about 6.8.

In another embodiment, the SBF includes: about 145 mM sodium ions, about 6 mM to about 9 mM potassium ions, from about 5 mM to about 12.5 mM calcium ions, about 1.5 mM magnesium ions, about 60 mM to about 175 mM chloride ions, about 4.2 mM to about 100 mM $HCO_3^-$, about 2 mM to about 5 phosphate ions, about 0.5 mM $SO_4^{2-}$ ions, and a pH of from about 5.8 to about 6.8, including from about 6.2 to about 6.8.

In yet another embodiment, the SBF includes: about 145 mM sodium ions, about 9 mM potassium ions, about 12.5 mM calcium ions, about 1.5 mM magnesium ions, about 172 mM chloride ions, about 4.2 mM $HCO_3^-$, about 5 mM to about 12.5 mM phosphate ions, about 0.5 mM $SO_4^{2-}$ ions, from about 4 mM to about 100 mM $CO_3^{2-}$, and a pH of from about 5.3 to about 6.0.

In embodiments that include a layered mineral coating, a core is incubated in a formulation of modified simulated body fluid. The layer of mineral coating forms on the core during the incubation period of minutes to days. After the initial layer of mineral coating is formed on the core, the mineral coated microparticle can be removed from the modified simulated body fluid and washed. To form a plurality of layers of mineral coating a mineral coated microparticle is incubated in a second, third, fourth, etc. modified simulated body fluid until the desired number of layers of mineral coating is achieved. During each incubation period a new layer of mineral coating forms on the previous layer. These steps are repeated until the desired number of layers of mineral coating is achieved.

During mineral formation active agents can be included in the modified simulated body fluid to incorporate active agents within the layer of mineral coating during mineral formation. Following formation of each layer of mineral, the mineral coated microparticle can then incubated in a carrier comprising at least one active agent to adsorb the agent to the layer of mineral coating. After incorporating an active agent within a layer of mineral coating and/or adsorbing an active agent to a layer of mineral coating, another layer of mineral coating can be formed by incubating the microparticle in another formulation of modified simulated body fluid. If desired, layers of mineral coating can incorporate an active agent in the mineral, layers can have an active agent adsorbed to the layer of mineral, the layer of mineral coating can be formed without incorporating an active agent or adsorbing an active agent, and combinations thereof. Mineral coated microparticles having different layers of mineral coating can be prepared by forming a layer of mineral using one formulation of modified simulated body fluid, then incubating the mineral coated microparticle in a different formulation of modified simulated body fluid. Thus, mineral coated microparticles can be prepared to have a plurality of layers of mineral coating wherein each layer is different. Embodiments are also contemplated that include two or more layers of mineral coating that are the same combined with one or more layers of mineral coating that are the different.

Tailoring the composition of the mineral coating in the different layers advantageously allows for tailored release kinetics of the active agent or active agents from each layer of the mineral coating.

In embodiments where incorporation of one or more active agents within the mineral coating is desired, the active agent is included in the SBF. As mineral formation occurs, active agent becomes incorporated with the mineral coating.

In other embodiments, magnetic material can be incorporated into mineral coatings. For example, superparamagnetic iron oxide linked to bovine serum albumin can be incorporated into mineral coatings. Linked proteins (e.g., bovine serum albumin) can adsorb onto the mineral coating to incorporate the magnetic material with the mineral coating.

In some embodiments, the mineral coating further includes a dopant. Suitable dopants include halogen ions, for example, fluoride ions, chloride ions, bromide ions, and iodide ions. The dopant(s) can be added with the other components of the SBF prior to incubating the substrate in the SBF to form the mineral coating.

In one embodiment, the halogen ions include fluoride ions. Suitable fluoride ions can be provided by fluoride ion-containing agents such as water soluble fluoride salts, including, for example, alkali and ammonium fluoride salts.

The fluoride ion-containing agent is generally included in the SBF to provide an amount of up to 100 mM fluoride ions, including from about 0.001 mM to 100 mM, including about 0.01 mM to about 50 mM, including from about 0.1 mM to about 15 mM, and including about 1 mM fluoride ions.

It has been found that the inclusion of one or more dopants in the SBF results in the formation of a halogen-doped mineral coating that significantly enhances the efficiency of biomolecule delivery to cells.

In yet other embodiments, magnetic materials, including magnetite, magnetite-doped plastics, and neodymium, are used for the microparticle core material. Including magnetic materials results in the formation of MCM for which location and/or movement/positioning of the MCM by application of a magnetic force is enabled. The alternate use of magnetic microparticle core materials allows for spatial control of where biomolecule delivery occurs in culture systems, for example, while analyzing biomolecule effect on cells.

The mineral coatings may be formed by incubating the substrate with the SBF at a temperature of about 37° C. for a period of time ranging from about 3 days to about 10 days.

After completing the mineral coating preparation, the mineral coatings can be analyzed to determine the morphology and composition of the mineral coatings. The composition of the mineral coatings can be analyzed by energy dispersive X-ray spectroscopy, Fourier transform infrared spectrometry, X-ray diffractometry, and combinations thereof. Suitable X-ray diffractometry peaks can be, for example, at 26° and 31°, which correspond to the (0 0 2) plane, the (2 1 1) plane, the (1 1 2) plane, and the (2 0 2) plane for the hydroxyapatite mineral phase. Particularly suitable X-ray diffractometry peaks can be, for example, at 26°and 31°, which correspond to the (0 0 2) plane, the (1 1 2) plane, and the (3 0 0) plane for carbonate-substituted hydroxyapatite. Other suitable X-ray diffractometry peaks can be, for example, at 16°, 24°, and 33°, which correspond to the octacalcium phosphate mineral phase. Suitable spectra obtained by Fourier transform infrared spectrometry analysis can be, for example, a peak at 450-600 $cm^{-1}$, which corresponds to O—P—O bending, and a peak at 900-1200 $cm^{-1}$, which corresponds to asymmetric P—O stretch of the $PO_4^{3-}$group of hydroxyapatite. Particularly suitable spectra peaks obtained by Fourier transform infrared spectrometry analysis can be, for example, peaks at 876 $cm^{-1}$, 1427 $cm^{-1}$, and 1483 $cm^{-1}$, which correspond to the carbonate ($CO_3^{2-}$) group. The peak for $HPO_4^{2-}$can be influenced by adjusting the calcium and phosphate ion concentrations of the SBF used to prepare the mineral coating. For example, the $HPO_4^{2-}$peak can be increased by increasing the calcium and phosphate concentrations of the SBF. Alternatively, the $HPO_4^{2-}$peak can be decreased by decreasing the calcium and phosphate concentrations of the SBF. Another suitable peak obtained by Fourier transform infrared spectrometry analysis can be, for example, a peak obtained for the octacalcium phosphate mineral phase at 1075 $cm^{-1}$, which can be influenced by adjusting the calcium and phosphate ion concentrations in the simulated body fluid used to prepare the mineral coating. For example, the 1075 $cm^{-1}$ peak can be made more distinct by increasing the calcium and phosphate ion concentrations in the simulated body fluid used to prepare the mineral coating. Alternatively, the 1075 $cm^{-1}$ peak can be made less distinct by decreasing the calcium and phosphate ion concentrations in the simulated body fluid used to prepare the mineral coating.

Energy dispersive X-ray spectroscopy analysis can also be used to determine the calcium/phosphate ratio of the mineral coating. For example, the calcium/phosphate ratio can be increased by decreasing the calcium and phosphate ion concentrations in the SBF. Alternatively, the calcium/phosphate ratio may be decreased by increasing the calcium and phosphate ion concentrations in the SBF. Analysis of the mineral coatings by energy dispersive X-ray spectroscopy allows for determining the level of carbonate ($CO_3^{2-}$) substitution for $PO_4^{3-}$and incorporation of $HPO_4^{2-}$into the mineral coatings. Typically, the SBF includes calcium and phosphate ions in a ratio ranging from about 10:1 to about 0.2:1, including from about 2.5:1 to about 1:1.

Further, the morphology of the mineral coatings can be analyzed by scanning electron microscopy, for example. Scanning electron microscopy can be used to visualize the morphology of the resulting mineral coatings. The morphology of the resulting mineral coatings can be, for example, a spherulitic microstructure, plate-like microstructure, and/or a net-like microstructure. Suitable average diameters of the spherulites of a spherulitic microstructure can range, for example, from about 2 μm to about 42 μm. Particularly suitable average diameters of the spherulites of a spherulitic microstructure can range, for example, from about 2 μm to about 4 μm. In another embodiment, particularly suitable average diameters of the spherulites of a spherulitic microstructure can range, for example, from about 2.5 μm to about 4.5 μm. In another embodiment, particularly suitable average diameters of the spherulites of a spherulitic microstructure can range, for example, from about 16 μm to about 42 μm.

Mineral coated microparticles can be stored for later use, washed and stored for later use, washed and immediately used for the adsorption step, or immediately used for the adsorption step without washing.

To adsorb the active agent to the mineral coated microparticle, the mineral coated microparticles are contacted with a solution containing the active agent. As used herein, "active agent" refers to biologically active materials. The active agent can be contacted with the mineral coated microparticle using any method known in the art. For example, a solution of the active agent can be pipetted, poured, or sprayed onto the mineral coated microparticle. Alternatively the mineral coated microparticle can be dipped in a solution including the active agent. The active agent adsorbs to the mineral coating by an electrostatic interaction between the active agent and the mineral coating of the mineral coated microparticle. Suitable active agents include biological molecules. Particularly suitable active agents include an interleukin-1 (IL-1; IL1F1) antagonist; an IL-1F2 antagonist; an IL-1F3 antagonist; an IL-1F4 antagonist; an IL-1F5 antagonist; an IL-1F6 antagonist; an IL-1F7 antagonist; an IL-1F8 antagonist; an IL-1F9 antagonist; an IL-1F10 antagonist; an IL-1F11 antagonist; abatacept; rituximab; tocilizumab; anakinra; adalimumab; etanercept; infliximab; certolizumab; golimumab; and combinations thereof. A particularly suitable IL-1 antagonist is IL-1 receptor antagonist (IL-Ra), a naturally occurring antagonist of pro-inflammatory IL-1. Particularly suitable IL-Ra include anakinra (e.g., KINERET®), which is a recombinant form of IL-Ra approved by the U.S. Food and Drug Administration (FDA) for treating systemic, chronic inflammation.

Adsorption of the active agent to the mineral coated microparticles can be tailored by changing the mineral constituents (e.g., high carbonate and low carbonate microspheres), by changing the amount of mineral coated microparticles incubated with the active agent, by changing the concentration of active agent in the incubation solution, and combinations thereof.

The active agent adsorbed to the mineral coating of the mineral coated microparticle is released as the mineral coating degrades. Mineral degradation can be controlled such that the mineral coating can degrade rapidly or slowly. Mineral coating dissolution rates can be controlled by altering the mineral coating composition. For example, mineral coatings that possess higher carbonate substitution degrade more rapidly. Mineral coatings that possess lower carbonate substitution degrade more slowly. Incorporation of dopants, such as fluoride ions, may also alter dissolution kinetics. Alterations in mineral coating composition can be achieved by altering ion concentrations in the modified simulated body fluid during coating formation. Modified simulated body fluid with higher concentrations of carbonate, 100 mM carbonate for example, results in coatings which degrade more rapidly than coatings formed in modified simulated body fluid with physiological carbonate concentrations (4.2 mM carbonate).

To incorporate the active agent(s) within the mineral coated microparticle, active agent(s) are included in the simulated body fluid during the mineral coating process. Particularly suitable active agents include interleukin-1 (IL-1; IL1F1) antagonist; an IL-1F2 antagonist; an IL-1F3 antagonist; an IL-1F4 antagonist; an IL-1F5 antagonist; an IL-1F6 antagonist; an IL-1F7 antagonist; an IL-1F8 antagonist; an IL-1F9 antagonist; an IL-1F10 antagonist; an IL-1F11 abatacept; rituximab; tocilizumab; anakinra; adalimumab; etanercept; infliximab; certolizumab; golimumab; and combinations thereof. A particularly suitable IL-1 antagonist is IL-1 receptor antagonist (IL-Ra), a naturally occurring antagonist of pro-inflammatory IL-1. Particularly suitable IL-Ra include anakinra (e.g., KINERET®), which are recombinant forms of IL-Ra approved by the U.S. Food and Drug Administration (FDA) for treating systemic, chronic inflammation.

To adsorb active agents on different layers of the mineral coated microparticle, mineral coated microparticles are incubated in a solution containing the active agent(s) after the formation of each layer. Some layers may have no active agent adsorbed onto the surface. Particularly suitable active agents include interleukin-1 (IL-1; IL1F1) antagonist; an IL-1F2 antagonist; an IL-1F3 antagonist; an IL-1F4 antagonist; an IL-1F5 antagonist; an IL-1F6antagonist; an IL-1F7 antagonist; an IL-1F8 antagonist; an IL-1F9 antagonist; an IL-1F10 antagonist; an IL-1F11 abatacept; rituximab; tocilizumab; anakinra; adalimumab; etanercept; infliximab; certolizumab; golimumab; and combinations thereof. A particularly suitable IL-1 antagonist is IL-1 receptor antagonist (IL-Ra), a naturally occurring antagonist of pro-inflammatory IL-1. Particularly suitable IL-Ra include anakinra (e.g., KINERET®), which are recombinant forms of IL-Ra approved by the U.S. Food and Drug Administration (FDA) for treating systemic, chronic inflammation.

Formulations of the present disclosure can then be prepared by adding a carrier to the mineral coated microparticles having the active agent adsorbed to the mineral coating. In one embodiment, a carrier including an active agent can be added to mineral coated microparticles having the active agent adsorbed to the mineral coating to prepare a formulation including bound active agent (active agent adsorbed to the mineral coated microparticle) and unbound active agent. In another embodiment, a carrier not including an active agent can be added to mineral coated microparticles having the active agent adsorbed to the mineral to prepare a formulation including bound active agent.

In particularly suitable formulation embodiments, the formulations include both bound and unbound active agent. Without being bound by theory, it is believed that injection of a formulation including mineral coated microparticles with bound active agent and unbound active agent allows unbound active agent to provide an immediate effect whereas bound active agent is sequestered by its adsorption to the mineral coated microparticle and provides a sustained effect as the mineral coating degrades and releases the active agent.

In one embodiment, the carrier is a pharmaceutically acceptable carrier. As understood by those skilled in the art, pharmaceutically acceptable carriers, and, optionally, other therapeutic and/or prophylactic ingredients must be "acceptable" in the sense of being compatible with the other ingredients of the formulation and not be harmful to the recipient thereof. Suitable pharmaceutically acceptable carrier solutions include water, saline, isotonic saline, phosphate buffered saline, Ringer's lactate, and the like. The compositions of the present disclosure can be administered to animals, preferably to mammals, and in particular to humans as therapeutics per se, as mixtures with one another or in the form of pharmaceutical preparations, and which as active constituent contains an effective dose of the active agent, in addition to customary pharmaceutically innocuous excipients and additives.

Formulations for parenteral administration (e.g. by injection, for example bolus injection or continuous infusion) can be presented in unit dose form in ampoules, pre-filled syringes, small volume infusion or in multi-dose containers with and without an added preservative. The formulations can take such forms as suspensions, solutions, or emulsions in oily or aqueous vehicles, and may contain formulation agents such as suspending, stabilizing and/or dispersing agents. Alternatively, the mineral coated microparticles with active agent may be in powder form, obtained for example, by lyophilization from solution, for constitution with a suitable vehicle, e.g. sterile, pyrogen-free water, before use.

In one aspect, the present disclosure is directed to a mineral coated microparticle comprising at least one active agent incorporated within a mineral coating and at least one active agent adsorbed to the mineral coating.

As disclosed herein, to incorporate the active agent(s) within the mineral coated microparticle, active agent(s) are included in the simulated body fluid during the mineral coating process. Particularly suitable active agents include those described herein.

As described herein, the active agent can be adsorbed to the mineral coating. The active agent can also be incorporated within the mineral of the mineral coated microparticle, as described herein. The active agent can further be adsorbed to the mineral coating and incorporated within the mineral of the mineral coated microparticle, as described herein. As also described herein, different active agents can be adsorbed to or incorporated within the mineral.

In another aspect, the present disclosure is directed to a method for immediate and sustained delivery of an active agent. The method includes providing a formulation to an individual in need thereof, the formulation including a carrier wherein the carrier comprises at least a first active agent; and a mineral coated microparticle comprising at least a second active agent adsorbed to the mineral coating.

In one embodiment, the active agent adsorbed to the mineral coating is the same as the active agent in the carrier. In another embodiment, the active agent adsorbed to the mineral coating is different from the active agent in the carrier. In another aspect, at least two different active agents are adsorbed to the mineral coating.

Suitable methods for administration of formulations of the present disclosure are by parenteral (e.g., IV, IM, SC, or IP) routes and the formulations administered ordinarily include effective amounts of product in combination with acceptable diluents, carriers and/or adjuvants. Standard diluents such as human serum albumin are contemplated for pharmaceutical compositions of the invention, as are standard carriers such as saline.

Sustained delivery of the active agent can be determined to obtain active agent release values that mimic established therapeutic levels of the active agent. The mass of mineral coated microparticles (with the active agent adsorbed) required to deliver a desired concentration of the active agent over a period of time can be calculated beforehand. For example, a single bolus injection of the active agent that provides the desired therapeutic effect can be delivered in a sustained manner over the desired period of time by obtaining the active agent release values from the mineral coated microparticles. Then the mass of mineral coated microparticles needed to deliver the active agent to provide the therapeutic effect of a desired period of time can be calculated. The localized and sustained delivery platform offers the benefit of continuous therapeutic levels of the active agent at the injury site without the requirement for multiple injections.

Effective dosages are expected to vary substantially depending upon the active agent(s) used and the specific disease, disorder, or condition treated. Because of the rapid and sustained delivery of the active agents contained in the formulations of the present disclosure, suitable dosages are expected to be less than effective dosages of active agents delivered via bolus injections. As described herein, mineral coated microparticles can be prepared to deliver an effective amount of the active agent over the course of several days. Thus, administration of formulations of the instant application provide a bolus administration of unbound active agent that has a rapid effect and the sustained release of the active agent during degradation of the mineral coating of the mineral coated microparticle has a sustained release of the active agent to maintain the effect over the course of hours to days as desired.

Formulations of the present disclosure can be administered to subjects in need thereof. As used herein, "a subject" (also interchangeably referred to as "an individual" and "a patient") refers to animals including humans and non-human animals. Accordingly, the compositions, devices and methods disclosed herein can be used for human and veterinarian applications, particularly human and veterinarian medical applications. Suitable subjects include warm-blooded mammalian hosts, including humans, companion animals (e.g., dogs, cats), cows, horses, mice, rats, rabbits, primates, and pigs, preferably a human patient.

As used herein, "a subject in need thereof" (also used interchangeably herein with "a patient in need thereof") refers to a subject susceptible to or at risk of a specified disease, disorder, or condition. The methods disclosed herein can be used with a subset of subjects who are susceptible to or at elevated risk of inflammatory diseases and disorders. Because some of the method embodiments of the present disclosure are directed to specific subsets or subclasses of identified subjects (that is, the subset or subclass of subjects "in need" of assistance in addressing one or more specific conditions noted herein), not all subjects will fall within the subset or subclass of subjects as described herein for certain diseases, disorders or conditions.

In another aspect, the present disclosure is directed to a method for treating an inflammatory disease in a subject in need thereof. The method includes administering a formulation to the subject, wherein the formulation includes a carrier that includes an active agent and a mineral coated microparticle, wherein the mineral coated microparticle comprises an active agent.

In some embodiments, the method is directed to systemically treating rheumatoid arthritis. In some embodiments, the method is directed to locally treating osteoarthritis.

Inflammatory diseases include arthritis, and in particular, rheumatoid arthritis and osteoarthritis. Other suitable inflammatory diseases include interleukin-1 associated diseases such as type 2 diabetes, autoimmune diseases, neonatal-onset multisystem inflammatory disease, and neuropathic diseases (e.g., Alzheimer's disease) as well as local and acute inflammatory situations (e.g. cutaneous and ligament wound healing).

The formulation can be administered by injection. For osteoarthritis, the formulation can be a synovial injection.

In one embodiment, the active agent adsorbed to the mineral coating is the same as the active agent in the carrier. In another embodiment, the active agent adsorbed to the mineral coating is different from the active agent in the carrier. In another aspect, at least two different active agents are adsorbed to the mineral coating.

Suitable active agents are described herein. Particularly suitable active agents can be Particularly suitable active agents include interleukin-1 (IL-1; IL1F1) antagonist; an IL-1F2 antagonist; an IL-1F3 antagonist; an IL-1F4 antagonist; an IL-1F5 antagonist; an IL-1F6 antagonist; an IL-1F7 antagonist; an IL-1F8 antagonist; an IL-1F9 antagonist; an IL-1F10 antagonist; an IL-1F11 abatacept; rituximab; tocilizumab; anakinra; adalimumab; etanercept; infliximab; certolizumab; golimumab; and combinations thereof. A particularly suitable IL-1 antagonist is IL-1 receptor antagonist (IL-Ra), a naturally occurring antagonist of pro-inflammatory IL-1. Particularly suitable IL-Ra include anakinra (e.g., KINERET®), which are recombinant forms of IL-Ra approved by the U.S. Food and Drug Administration (FDA) for treating systemic, chronic inflammation.

Suitable methods for administration of formulations of the present disclosure are by parenteral (e.g., IV, IM, SC, or IP) routes as described herein.

In another aspect, the present disclosure is directed to a method for treating post-surgery inflammation in a subject in need thereof. The method includes administering a formulation to the subject, wherein the formulation includes a carrier that includes an active agent and a mineral coated microparticle, wherein the mineral coated microparticle comprises an active agent.

Suitable active agents are described herein. Particularly suitable active agents can be Particularly suitable active agents include interleukin-1 (IL-1; IL1F1) antagonist; an IL-1F2 antagonist; an IL-1F3 antagonist; an IL-1F4 antagonist; an IL-1F5 antagonist; an IL-1F6 antagonist; an IL-1F7 antagonist; an IL-1F8 antagonist; an IL-1F9 antagonist; an IL-1F10 antagonist; an IL-1F11 abatacept; rituximab; tocilizumab; anakinra; adalimumab; etanercept; infliximab; certolizumab; golimumab; and combinations thereof. A particularly suitable IL-1 antagonist is IL-1 receptor antagonist (IL-Ra), a naturally occurring antagonist of pro-inflammatory IL-1. Particularly suitable IL-Ra include anakinra (e.g., KINERET®), which are recombinant forms of IL-Ra approved by the U.S. Food and Drug Administration (FDA) for treating systemic, chronic inflammation.

Suitable methods for administration of formulations of the present disclosure are by parenteral (e.g., IV, IM, SC, or IP) routes as described herein.

EXAMPLES

Example 1

In this Example, IL-Ra binding to Mineral coated microparticles was determined.

Figure 2A:
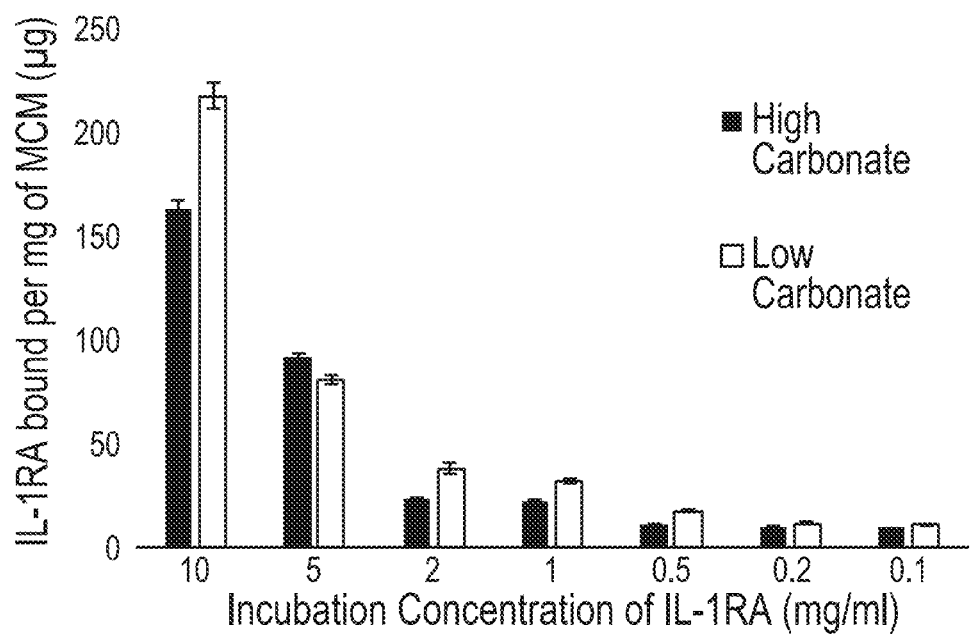
FIG. 2A is a graph depicting the binding of IL-Ra to differing formulations of mineral coated microparticles (e.g., high carbonate and low carbonate microparticles) and differing concentrations of active agent in the incubation solution.
Figure 2B:
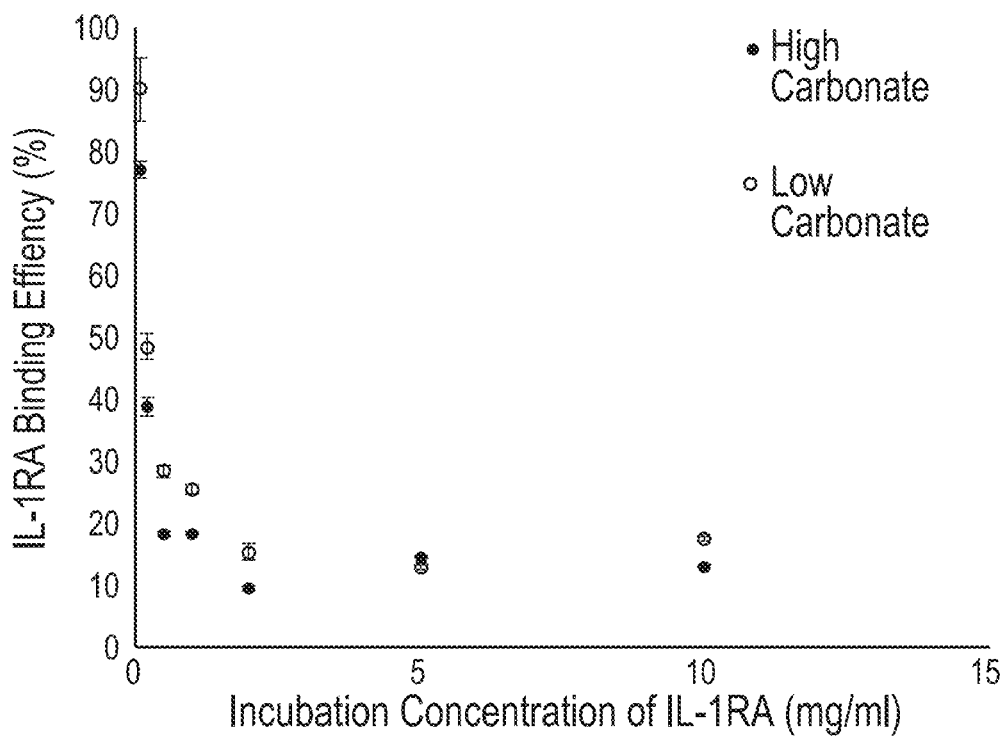
FIG. 2B is a graph depicting the binding efficiency of IL-Ra by high carbonate and low carbonate microparticles and differing concentrations of active agent in the incubation solution.
Figure 3:
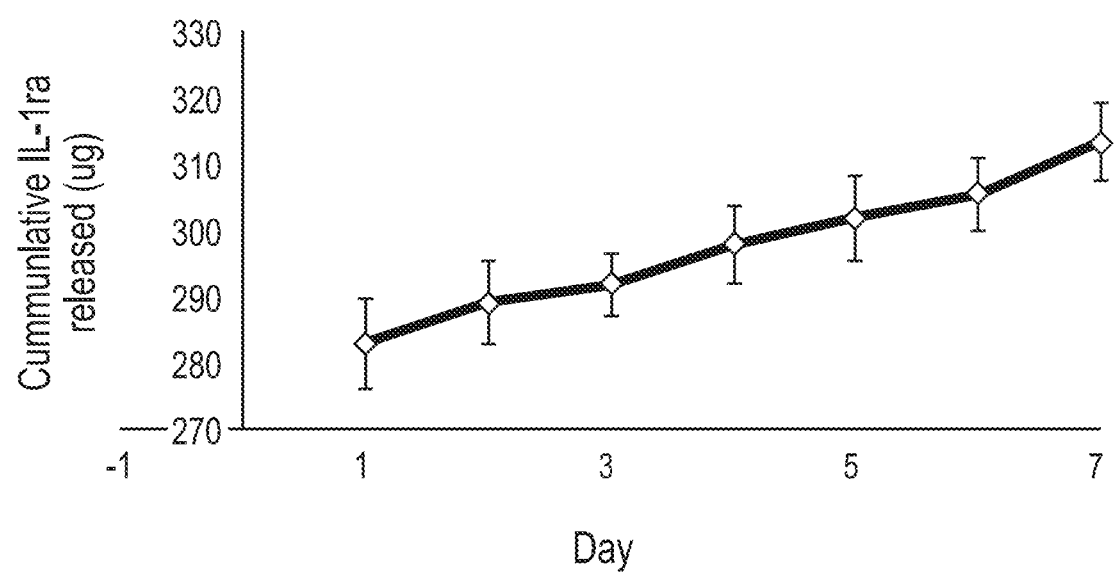
FIG. 3 is a graph depicting the sustained release of IL-Ra by mineral coated microparticles over 7 days.

Mineral coated microparticles (referred to herein interchangeably as "MCM" and "MPs") were fabricated by incubating β-TCP microparticles in mSBF (2× calcium and phosphate concentration of human serum), refreshed daily, for 7 days, as described in Suárez-González et al. (Acta Biomater. 8 (2012)). Carbonate concentration in the mSBF were varied (4.2 mM or 100 mM) to form MCMs with different coating compositions. IL-Ra binding efficiency was determined by incubating MCMs in varying concentrations of IL-Ra in phosphate buffered saline (PBS). BCA was used to measure the IL-Ra protein concentration in the binding solution before and after MCM incubation. The difference in protein concentration before and after MCM incubation was used to determine the amount of protein bound to the microparticle. A no MCM control was used to determine the amount of IL-Ra lost to protein absorption onto the tube walls during binding. IL-Ra loaded MCMs were then incubated under continuous rotation at 37° C. in simulated body fluid (SBF) to determine protein release kinetics. SBF was changed and collected daily for 14 days and micro BCA was used to determine protein release. Initial binding and release studies were conducted for multiple coating formulations (varying concentrations of carbonate) to determine the mineral coating providing for IL-Ra binding and release having the highest binding efficiency, to lower burst release, and provide sustained delivery in the therapeutic range. Results are provided in FIGS. 2 and 3.

Example 2

In this Example, the biological activity of IL-Ra released from MCMs was determined.

Figure 4A:
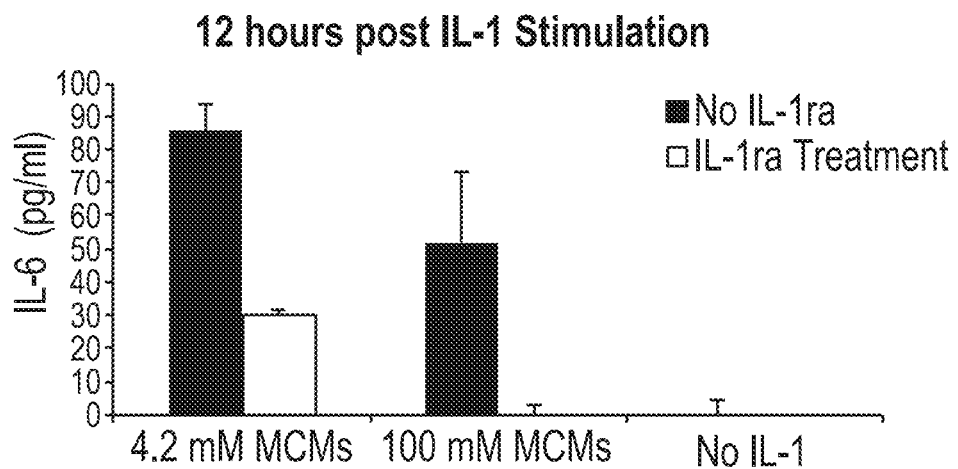
FIG. 4A is a graph depicting IL-Ra released from mineral coated microparticles was active and inhibited IL-6 production in macrophages stimulated with IL-1. The media concentration of IL-6 produced by macrophages incubated with 4.2 mM mineral coated microparticles containing IL-Ra, 100 mM mineral coated microparticles containing IL-Ra, soluble IL-Ra, unloaded microparticles, and no IL-Ra 12 hours after stimulation with IL-1 is represented.
Figure 4B:
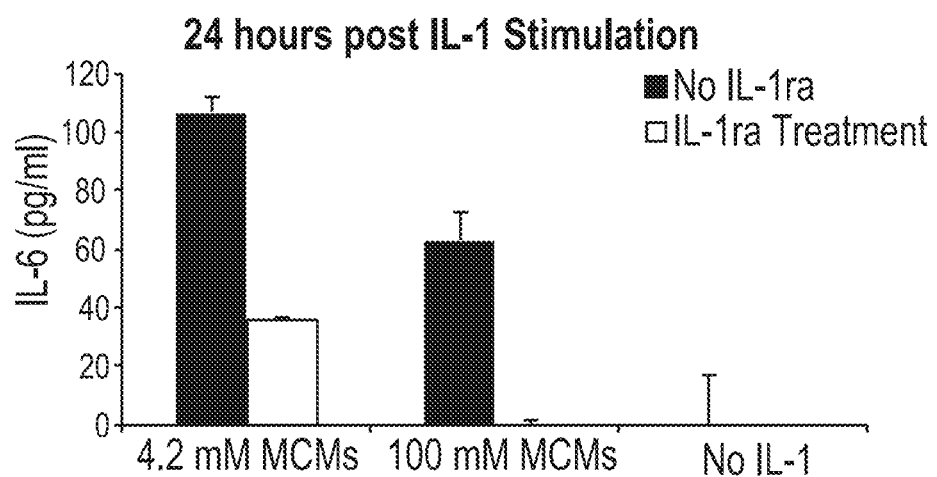
FIG. 4B is a graph depicting IL-Ra released from mineral coated microparticles was active and inhibited IL-6 production in macrophages stimulated with IL-1. The media concentration of IL-6 produced by macrophages incubated with 4.2 mM mineral coated microparticles containing IL-Ra, 100 mM mineral coated microparticles containing IL-Ra, soluble IL-Ra, unloaded microparticles, and no IL-Ra 24 hours after stimulation with IL-1 is represented.
Figure 6:
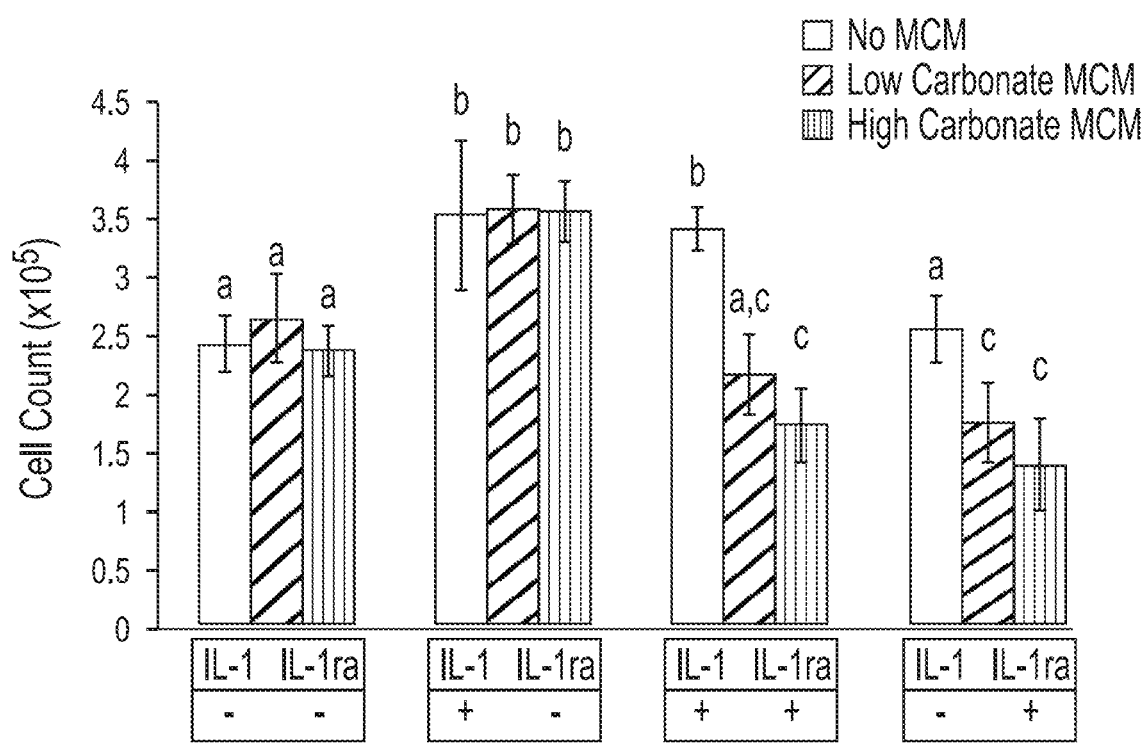
FIG. 6 is a graph depicting the biological activity of IL-Ra released from microparticles to reduce IL-1-induced proliferation of mouse T lymphocytes.

Mouse D10.G4 Thymocytes exposed to IL-1 will proliferate and were used for IL-Ra bioactivity studies. Thymocytes were cultured in IL-1 media containing IL-Ra loaded MCMs, unloaded MCMs, or bolus IL-Ra alone (FIG. 6). Thymocyte proliferation was determined by cell counts and cell titer blue viability assays. IL-Ra loaded MCMs inhibited IL-1 induced thymocyte proliferation demonstrating that IL-Ra delivered via MCMs remained biologically active. To further explore the biological activity of IL-Ra released from MCMs, IL-1 stimulated, phorbol 12-myristate 13-acetate (PMA) activated THP-1 macrophages were cultured with IL-Ra loaded MCMs or unloaded MCMs. IL-1 induces the production of many inflammatory cytokines, including IL-6, by THP-1 macrophages (FIG. 4). Secretion of these cytokines was measured using IL-6 ELISA on the cell culture supernatants. IL-Ra loaded MCMs inhibited the production of IL-6 by IL-1 stimulated THP-1 macrophages when compared to unloaded MCMs12 and 24 hours after IL-1 stimulation (FIGS. 4A and 4B), which demonstrates further that IL-Ra released from MCMs remains biologically active.

Example 3

In this Example, the effect of systemic delivery of IL-Ra via subcutaneous injection of IL-Ra loaded MCMs in an IL-Ra solution on IL-1 induced inflammation was determined.

Figure 5:
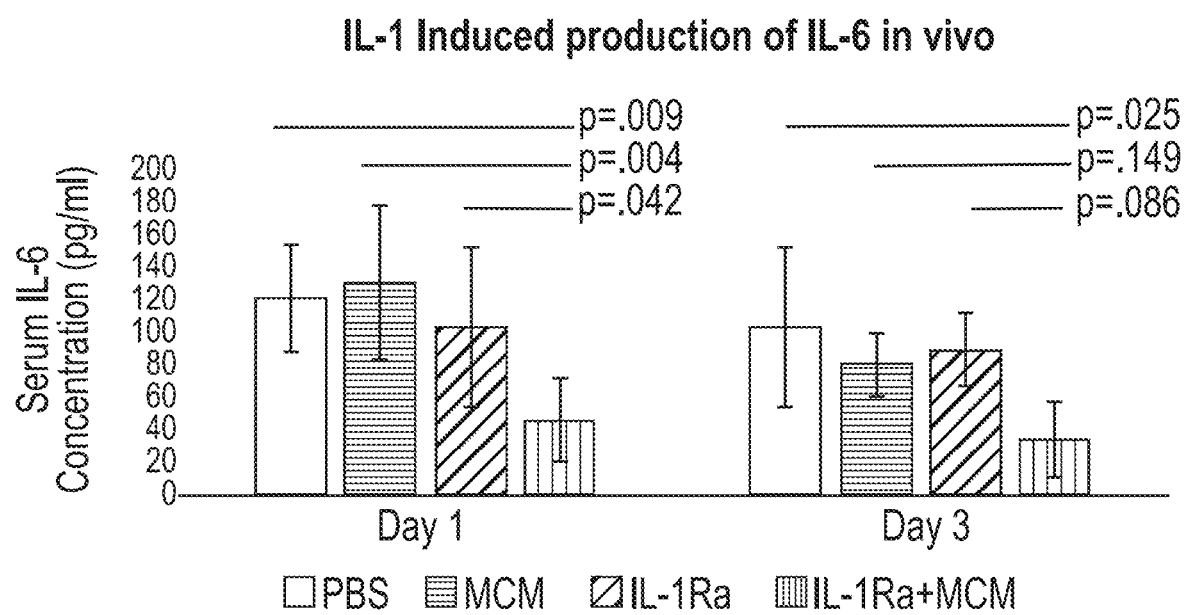
FIG. 5 is a graph depicting the inhibition of IL-1 induced production of IL-6 in vivo when mice received a single subcutaneous injection of PBS, unloaded microparticles, soluble IL-Ra, or IL-Ra microparticles (MPs incubated in soluble IL-Ra).

IL-Ra was delivered through a subcutaneous injection of either IL-Ra loaded MCMs or IL-Ra in solution to inhibit IL-1 induced inflammation in a mouse model. An unloaded microparticle injection and PBS injection controls were examined Mice (n=5/treatment) were injected subcutaneously with either 0.1 ml of PBS (PBS), 1 mg 4.2 mM carbonate MCMs in 0.1 ml PBS (MCM), 0.1 ml of 10 mg/ml soluble IL-Ra (IL-Ra), or 0.1 mg/ml IL-Ra+1 mg 4.2 mM carbonate MCMs (IL-Ra+MCMs). For the IL-Ra+MCM group, MCMs were incubated in the IL-Ra solution for ~1 hr prior to injection. After 1 day or 3 days post treatment, mice were injected with 10 ng rhIL-1B I.P. to induce IL-1 production of IL-6. Blood was collected at 2 hours post IL-1 treatment to examine IL-6 levels in plasma via ELISA. Effective IL-Ra treatment will reduce the serum levels of IL-6 2 hours after IL-1 administration. Only IL-Ra+MCMs significantly decreased serum IL-6 at 1 day and 3 days post treatment when compared to the PBS control (FIG. 5).

Example 4

In this Example, the effect of intra-ligamentous injection of MCMs on inflammation during ligament healing was determined.

Figure 7:
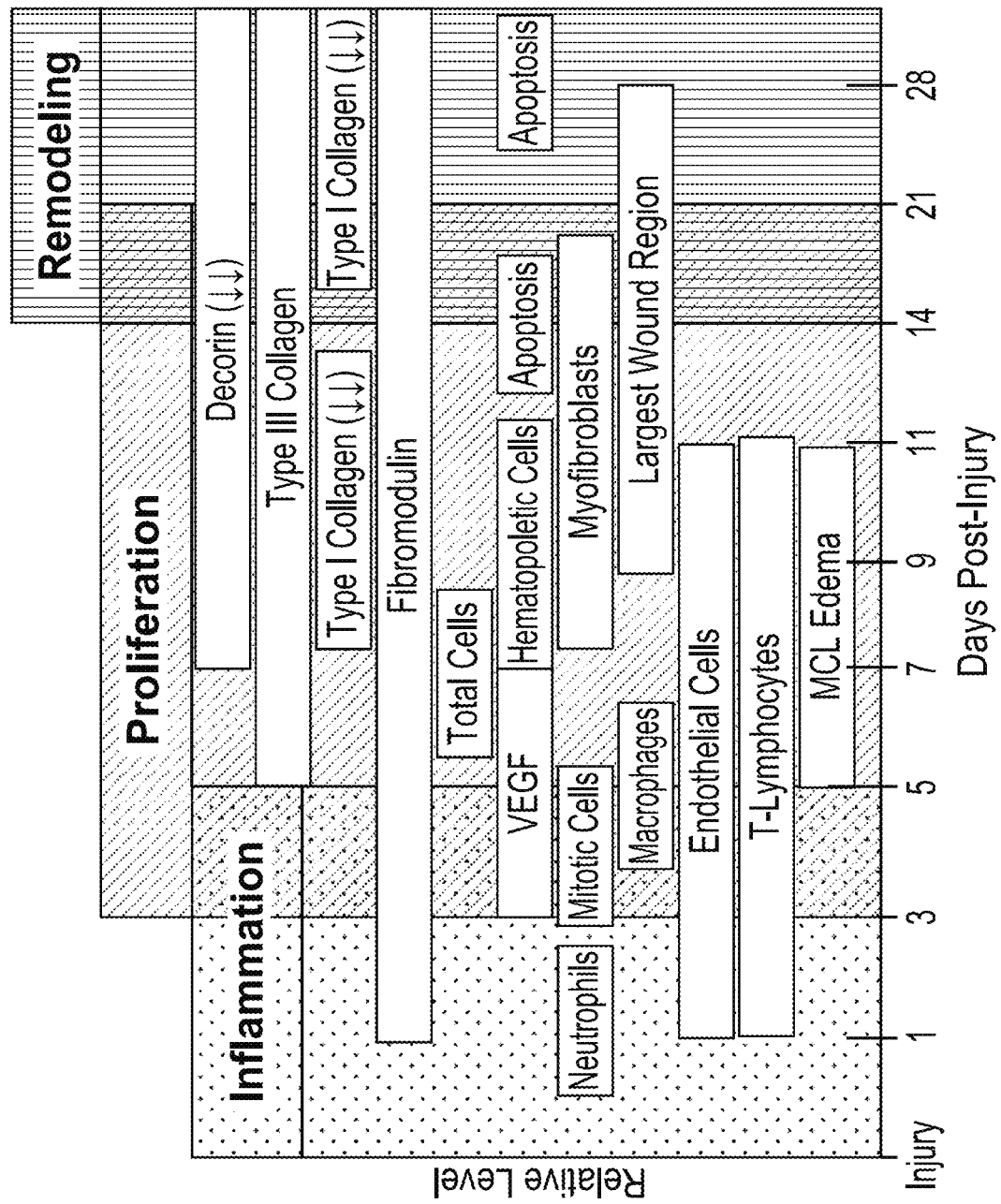
FIG. 7 is a temporal diagram depicting rat MCL healing which consists of 3 overlapping phase: the inflammatory phase, the proliferative phase, and the remodeling phase. The inflammatory phase, during which inflammatory cells infiltrate the ligament and IL-1 levels are elevated, spans from the day of injury to day 5 post injury.
Figure 8A:
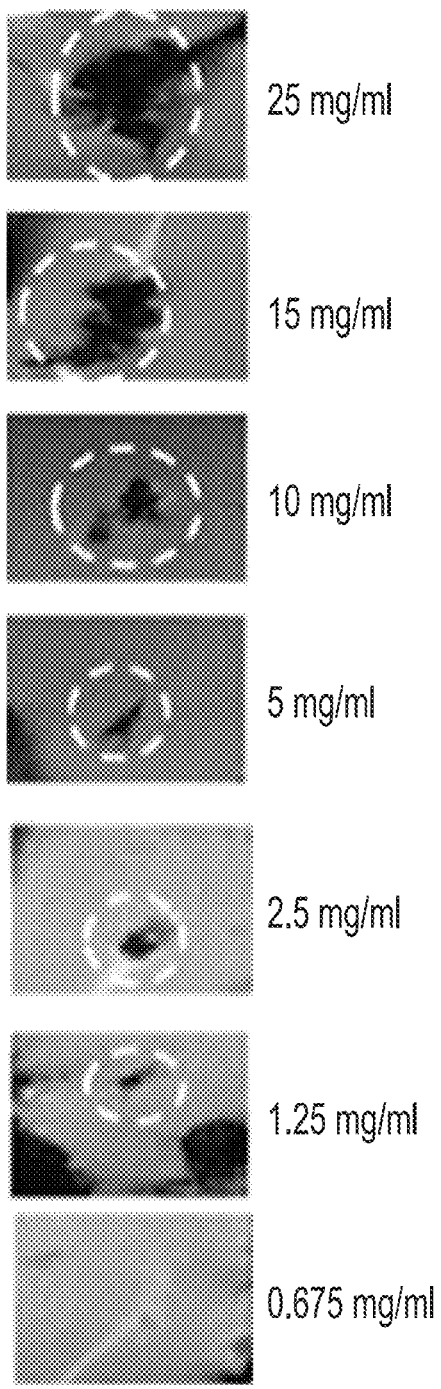
FIG. 8A are magnetic resonance images (MRI) showing different concentrations of SPIO labeled mineral coated microparticles injected intramuscularly using T2 weighted MRI demonstrated decreased hypointensive area with decreasing microparticle concentration.
Figure 8B:
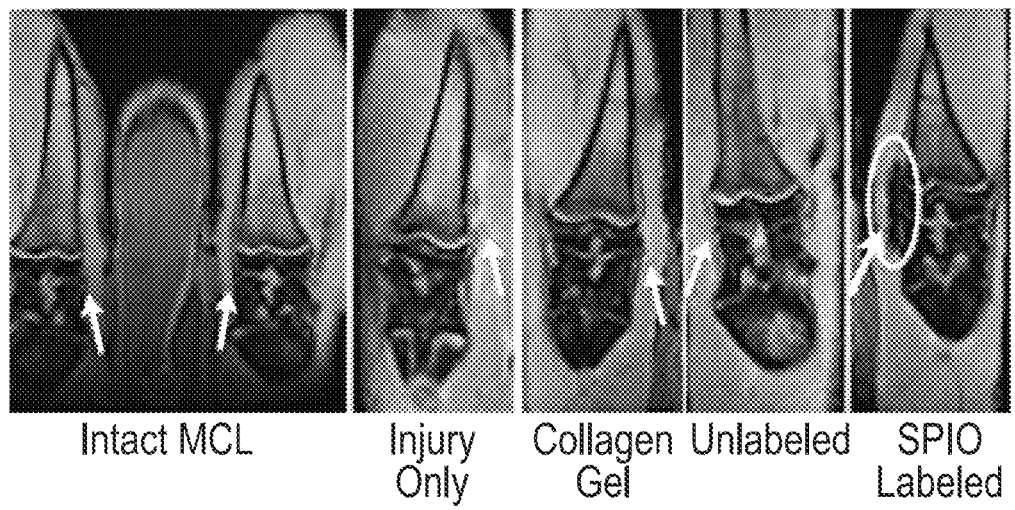
FIG. 8B are magnetic resonance images (MRI) showing SPIO labeled MCMs in the healing rat MCL when injected after injury.
Figure 8C:
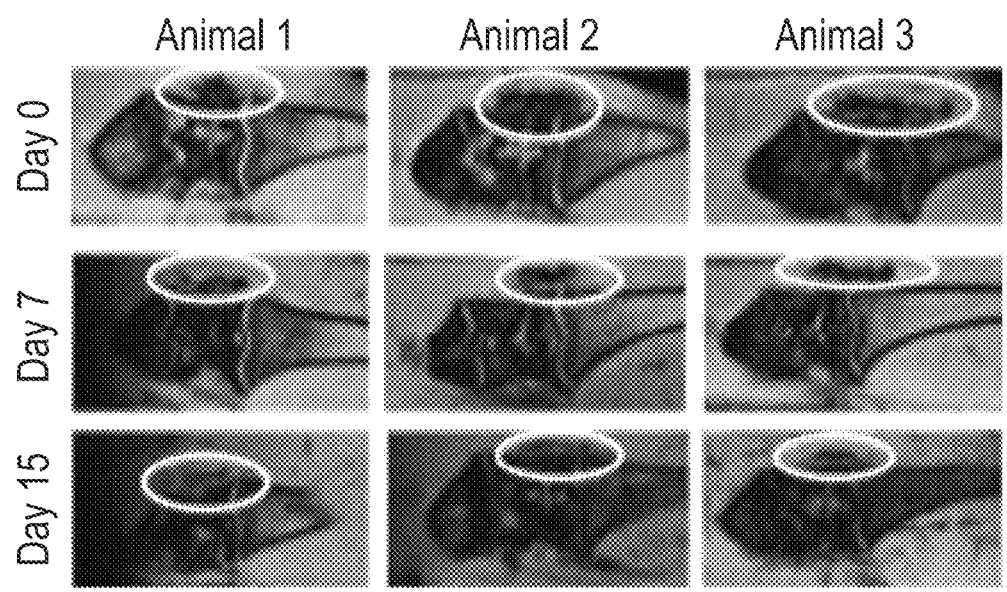
FIG. 8C are magnetic resonance images (MRI) showing that MCMs remained localized within the MCL for at least 15 days after injection.
Figure 9A:
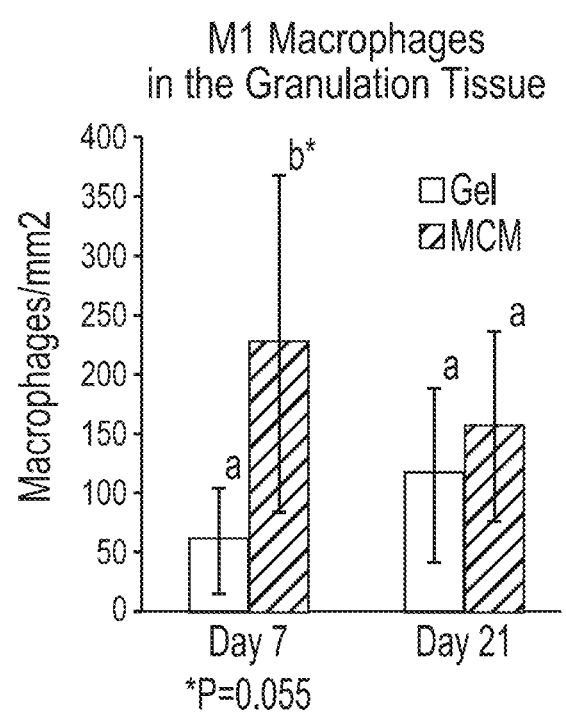
FIG. 9A is a graph depicting upregulation of M1 macrophages by MCMs in the granulation tissue 7 days after injury without inducing chronic inflammation 14 days after injury.
Figure 9B:
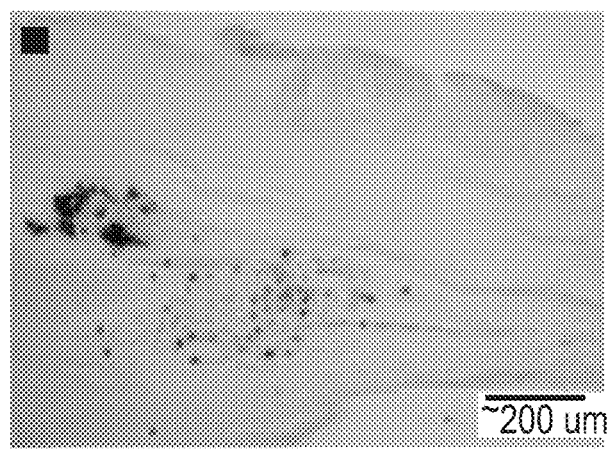
FIG. 9B is a light micrograph showing that MCMs remained localized within the MCL for 7 days post-injection as indicated by alizarin red staining of calcium, but do not impact ligament structure or cause additional edema.
Figure 9C:
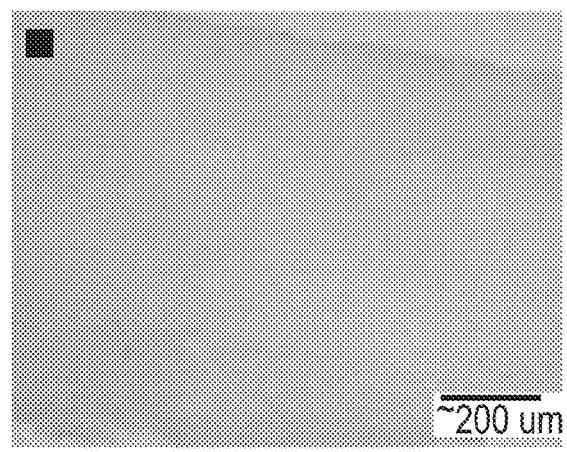
FIG. 9C is a light micrograph showing that MCMs were no longer present in the MCL 21 days post-injection and showing no impact on ligament morphology or calcification of the tissue.

The stages of healing of the rat MCL were mapped and it was determined that the inflammatory phase occurs between days 0-5 post injury (FIG. 7). Therefore, treatment with anti-inflammatory factors, such as IL-Ra is important within the first 5 days after injury, when the inflammatory cell populations and pro-inflammatory cytokines are at their highest levels. To determine the localization of MCMs within an injured MCL, MCMs were labeled with superparamagnetic iron oxide (SPIO), which made them visible using T2 weighted MRI (FIGS. 8A-8B). MCM localization within the MCL was determined to remain at the site of injury for at least 15 days (FIG. 8C). To determine potential adverse effects from the MCM delivery system, histology was used to determine whether MCMs cause a prolonged inflammatory response or ligament calcification. While pro-inflammatory (M1) macrophages localized around the MCMs at early times during ligament healing (FIG. 8A) there was not a prolonged M1 response. Staining with Alizrin red showed that after MCM dissolution, no ligament tissue was calcified and the MCMs did not appear to effect ligament architecture (FIGS. 9B and 9C).

Example 5

In this Example, the sustained delivery of IL-Ra from microparticles and ability to inhibit IL-1 activity in vitro and in vivo was determined.

Microparticles were fabricated by incubating (β-TCP) cores (Plasma Biotal Limited, Derbyshire, UK) were incubated in modified simulated body fluid (mSBF) to form calcium phosphate (CaP) mineral coated microparticles (MPs). mSBF was prepared by dissolving NaCl (141 mM), KCl (4.0 mM), MgSO$_4$ (0.5 mM), MgCl$_2$ (1.0 mM), CaCl$_2$ (5.0 mM), KH$_2$PO$_4$ (2.0 mM), and NaHCO$_3$ (4.2 mM) and buffered to a pH of 6.8. β-TCP (100 mg) was incubated in 50 ml of mSBF for 7 days under continuous rotation at 37° C. to form MPs. The mSBF solution was replaced daily to maintain adequate calcium and phosphate ion concentrations for continued coating growth.

Figure 10A:
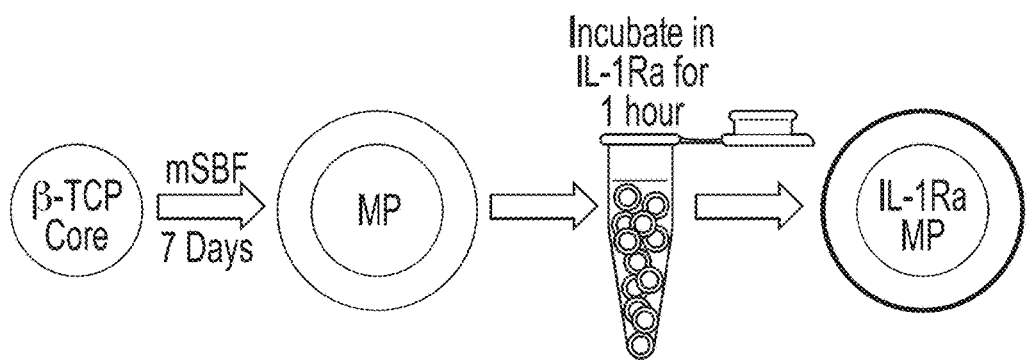
FIGS. 10A-10D show that the mass of IL-Ra bound to MPs can be tailored and MPs release IL-Ra in a sustained manner.
Figure 10B:
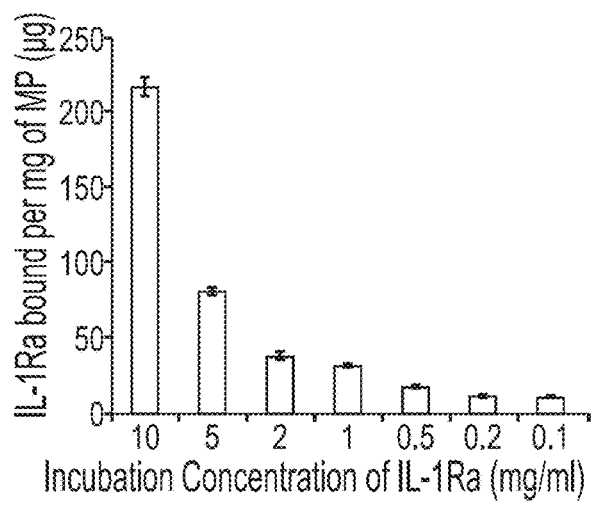

1 mg of MPs was incubated in 1 ml of varying IL-Ra (Swedish Orphan Biovitrum, Stockholm, Sweden) concentrations (10, 5, 2, 1, 0.5, and 0.1 mg/ml) in phosphate buffered saline (PBS) for 1 hour under continuous rotation at 37° C. in 1.5 ml Protein LoBind Eppendorf tubes (Eppendorf, Hamburg, Germany), n=3 samples per condition, as depicted in FIG. 10A. MPs were then centrifuged at 200 rcf for 5 minutes and the supernatant removed. To examine protein binding to the MPs, 1 mg of IL-Ra MPs was dissolved in 50 µl of 2N HC1. 20 µl of the dissolved IL-Ra MP sample or IL-Ra standard was mixed with 200 µl of fluoraldehyde o-phthaldialdehyde in a black 96 well plate. Samples were excited at 360 nm and fluorescence was read at 460 nm to quantify protein concentration in solution (n=3 per condition).

IL-Ra MPs used for all in vitro and in vivo assays were created by incubating MPs in 10 mg/ml IL-Ra for 1 hour. IL-Ra released from MPs was examined in SBF[35]. 1 mg/ml of IL-Ra MPs was incubated in SBF under continuous rotation at 37° C. in 1.5 ml Protein LoBind Eppendorf tubes. SBF was changed and collected daily and an IL-Ra standard was created in SBF (n=3 per condition). A fluoraldehyde o-phthaldialdehyde assay was utilized to measure the concentration of protein in solution, as described above.

Figure 11A:
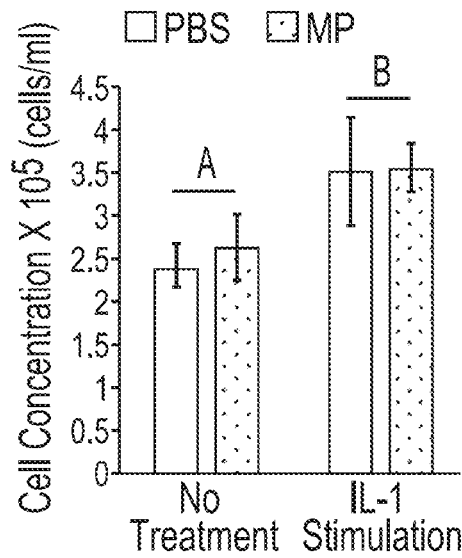
FIGS. 11A-11E depict that IL-Ra released from MPs is biologically active in vitro.
Figure 11B:
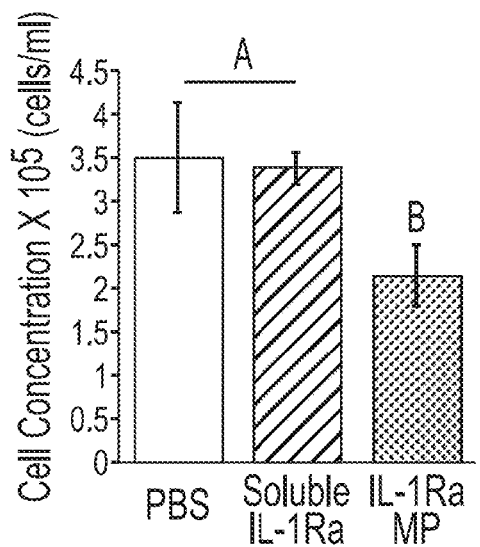
Figure 11C:
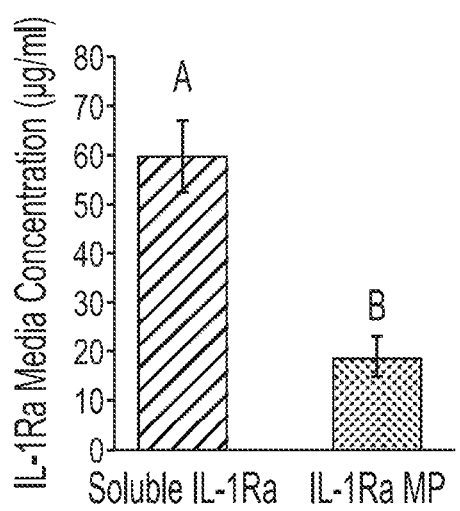
Figure 11D:
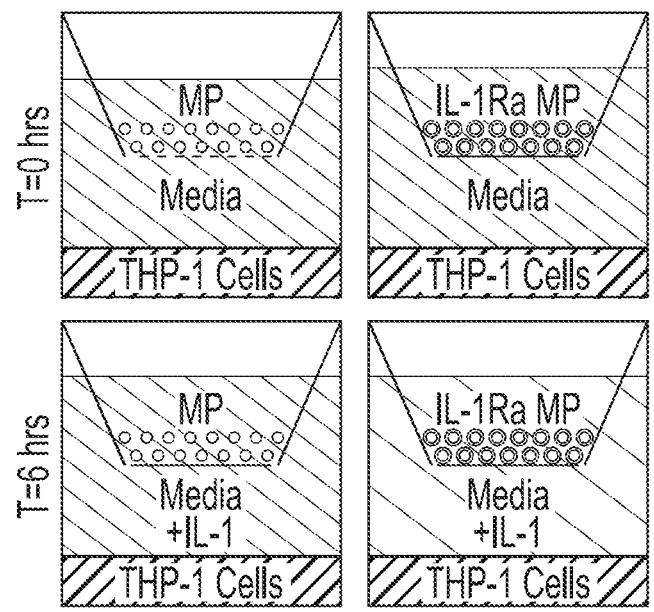

For in vitro IL-Ra activity assays, THP-1 human monocytes (ATCC, Manassas, Virginia) were propagated. 2×10$^5$ cells were plated in 1 ml of RPMI 1640 with glutagro (Thermo Fisher Scientific, Hampton, NJ) with 10% FBS (Gibco from Thermo Fisher Scientific) in 12 well transwell plates (Costar, Kennebunk, ME). 100 nM phorbol 12-myristate 13-acetate (PMA) (Sigma-Aldrich, St Louis, MO) was added to the media to differentiate the cells to macrophages. 3 days after PMA activation, 1 mg of IL-Ra MPs or 1 mg unloaded MPs was added to the media in the transwell insert (n=6 wells per treatment condition). 6 hours after treatment, 2 µl of 5 µg/ml human IL-1β (R&D systems, Minneapolis, MN) was added to the culture media, as depicted in FIG. 11D. 200 µl of media was removed from each well 12 and 24 hours post IL-1 addition. A human IL-6 ELISA (R&D Systems, Minneapolis, MN) was run according to kit instructions to examine IL-6 levels in the media samples.

D10.G4.1 mouse T-lymphocytes (ATCC) were propagated according to protocol provided by ATCC. 1.5×10$^5$ cells were plated in 0.45 ml of RPMI with 10% FBS, and 10% T-cell culture supplement (Corning, Corning, NY) in a 24 well tissue culture plate. Cells were treated with IL-Ra MPs (0.5 mg), unloaded MPs (0.5 mg), soluble IL-Ra (50 µg), or no treatment was added to each well (n=6 wells/treatment). 6 hours post treatment, recombinant IL-1β (10 pg/ml) was added to the appropriate wells (n=3 wells/treatment group). 48 hours after IL-1β addition, cell numbers were counted using trypan blue exclusion. Media was also collected, and a human IL-Ra ELISA (Life Technologies, Carlsbad, CA) was run according to kit instructions.

For in vivo delivery of IL-Ra, following approval by the University of Wisconsin-Madison Institutional Animal Care and Committee, 12-13 week old male C57B16 mice (Envigo, Huntingdon, United Kingdom.) were administered 100 µl subcutaneous (s.c.) injections of 4 treatments; 1 mg IL-Ra MPs in the loading solution (10 mg/ml IL-Ra), 10 mg/ml IL-Ra, 1 mg unloaded MPs in PBS, or PBS (n=10 animals/treatment). IL-Ra MPs were incubated in the 10 mg/ml IL-Ra loading solution for 1 hour prior to injection. Mice were separated into 2 groups of 5 animals/treatment (Groups A and B) to examine IL-Ra serum concentrations and activity at different times. Animals in group A received a 100 µl intraperitoneal (i.p.) injection of recombinant IL-1β (100 ng/ml; R&D systems, Minneapolis, MN) 1, 5, and 14 days after treatment while animals in group B received IL-1β injections 3, and 7 days after treatment. 2 hours after each IL-1β injection, maxillary bleeds were performed to collect blood in cherry red collection tubes with a gel to separate the serum (Terumo, Elkton, MD). Animals with signs of infection at the bleeding location or which had no reaction to the IL-1 were excluded from the study. Blood samples were centrifuged and serum was obtained for mouse IL-6 Quantikine (R&D Systems, Minneapolis, MN) and human IL-Ra ELISAs (Life Technologies, Carlsbad, CA) following kit instructions. IL-6 levels were normalized to the PBS control group collected on the same day.

Figure 13A:
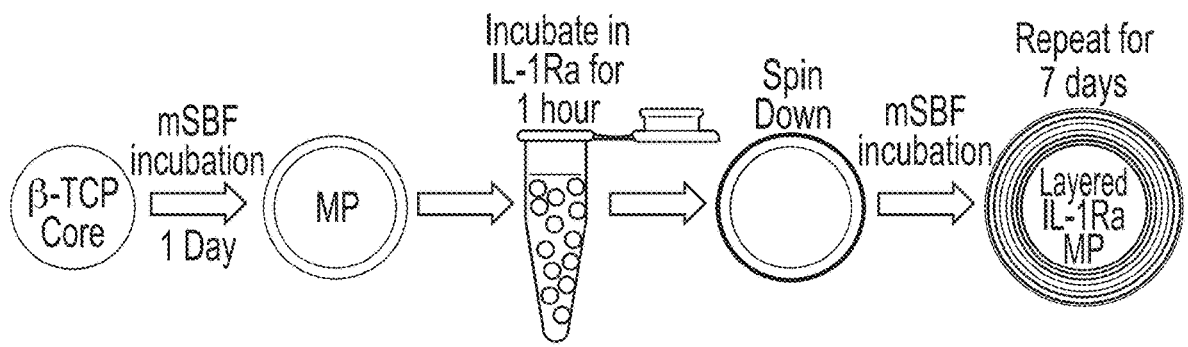
FIGS. 13A-13E depict that layered IL-Ra MPs bound more IL-Ra, released IL-Ra at a slower rate with a lower burst release, and inhibited IL-1 activity in vivo for an extended duration.

Layered IL-Ra MPs were fabricated by incubating the MPs in a solution containing 1 mg/ml IL-Ra for 1 hour each day during the coating process, as depicted in FIG. 13A. After 7 days of coating, layered MPs were incubated in 10 mg/ml IL-Ra for 1 hour to form layered IL-Ra MPs. Protein loading and release were performed as described for the IL-Ra MPs. In vivo delivery of layered IL-Ra MP was also performed as previously described, except mice were administered 100 µl s.c. injections of layered IL-Ra MPs in the loading solution (10 mg/ml) (n=10) or PBS (n=10). Animals then received 100 µl i.p. injections of IL-1β (100 ng/ml) on either day 1, 3, and 7 (n=5/treatment) or day 5, 10, and 14 post treatment (n=5/treatment), and bled 2 hours after IL-1β administration as described for IL-Ra MPs.

Figure 10C:
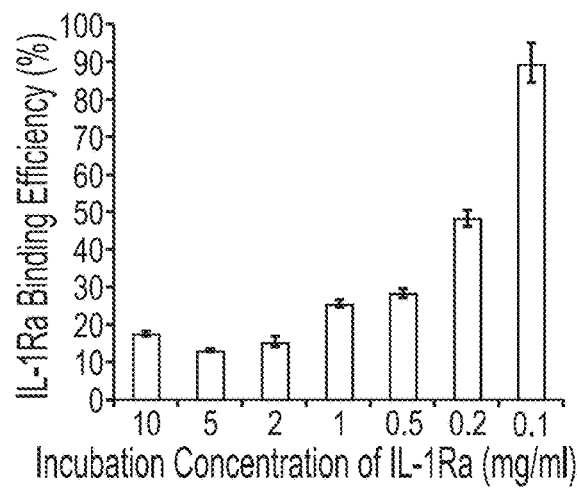

MPs efficiently bound IL-Ra in a concentration dependent manner IL-Ra MPs were fabricated by incubating β-TCP cores in mSBF for 7 days followed by a 1 hour incubation in a loading solution of IL-Ra in PBS, as depicted in FIG. 10A. MPs incubated with IL-Ra demonstrated a concentration-dependent increase in the mass of IL-Ra bound (FIG. 10AB). Specifically, MPs incubated in a loading solution containing the highest concentration of IL-Ra (10 mg/ml IL-Ra), bound 217.5 µg of IL-Ra per mg MP, while MPs incubated in a loading solution containing the lowest concentration of IL-Ra (0.1 mg/ml IL-Ra) bound 11.2 µg of IL-Ra per mg MP. In addition, the binding efficiency of IL-Ra to MPs was inversely related to the concentration of IL-Ra in the binding solution (FIG. 10C). Binding efficiency ranged from 17.4% when MPs were loaded in the highest IL-Ra concentration, to 90.0% when MPs were loaded in the lowest IL-Ra concentration.

Figure 10D:
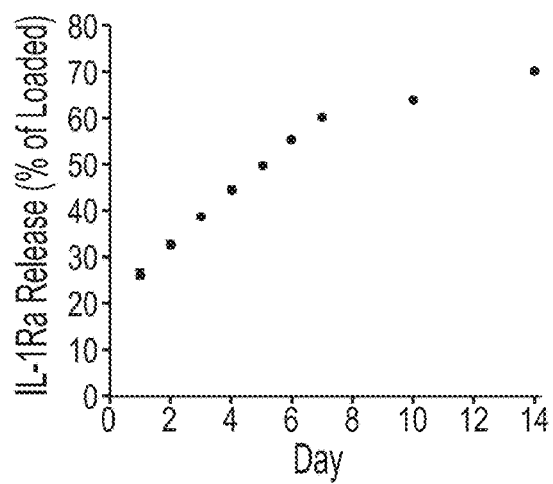

MPs released IL-Ra over an extended timeframe in vitro (FIG. 10D). An initial burst release of 26.2% of the loaded IL-Ra (50.3 µg IL-Ra/mg MPs) was followed by a linear release rate of ~5.6 µg IL-Ra/mg MPs/day for 7 days, after which the release rate decreased to ~1.43 µg IL-Ra/mg MPs/day. By day 14, MPs released 70.3% of the initially loaded IL-Ra (70.25 µg IL-Ra/mg MPs).

IL-Ra delivered via MPs was biologically active, as measured by the ability to inhibit IL-1 induced activity in vitro. Inhibition of IL-1 activity was assessed in two cellular assays; 1) inhibition of IL-1 induced proliferation of D10.G4.1 mouse T-lymphocytes and 2) inhibition of IL-1 induced production of IL-6 by THP-1 human macrophages.

Figure 11E:
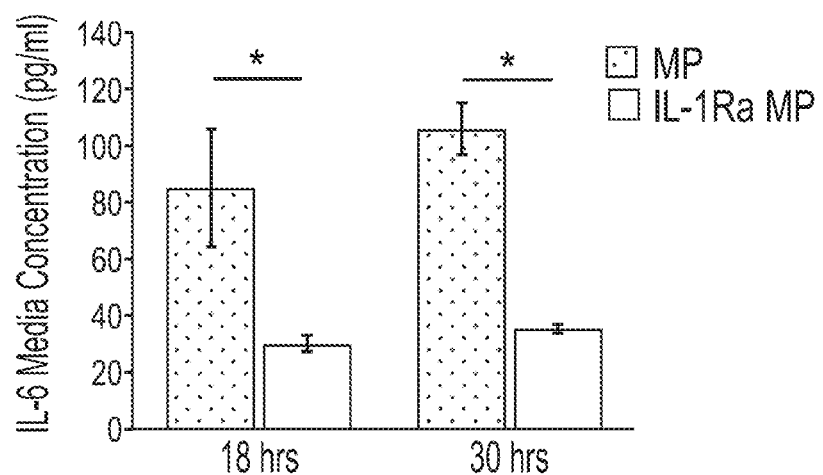

The T-lymphocyte experiments demonstrated that, regardless of MP presence, IL-1 increased D10.G4.1 mouse T-lymphocyte cell concentration (PBS: $3.51\times10^5\pm0.63\times10^5$ cells/ml and unloaded MP: $3.56\times10^5\pm0.28\times10^5$ cells/ml) when compared to cells cultured without IL-1 (PBS: $2.46\times10^5\pm0.25\times10^5$ cells/ml and unloaded MP: $2.63\times10^5\pm0.38\times10^5$ cells/ml) (FIG. 11A). The IL-1-stimulated increase in T-lymphocyte concentration was inhibited by IL-Ra MPs ($2.15\times10^5\pm0.35\times10^5$ cells/ml) when compared to bolus delivery of soluble IL-Ra ($3.4\times10^5\pm0.18\times10^5$ cells/ml) or PBS ($3.51\times10^5\pm0.63\times10^5$ cells/ml) (FIG. 11B). IL-Ra within the supernatant, was significantly higher in samples treated with soluble IL-Ra (when compared to IL-Ra MP (FIG. 11C), and was undetectable in the PBS treated controls (not shown) 2 days after treatment, which indicates that IL-Ra activity, and not concentration alone, was responsible for reduction in T-lymphocyte concentration when delivered with MPs compared to soluble IL-Ra. In another set of experiments, culture of THP-1 cells in a transwell culture system which did not allow for direct contact between the cells and the MPs (depicted in FIG. 11D) demonstrated that IL-Ra released from MPs was biologically active. Specifically, IL-Ra MPs significantly reduced IL-1-stimulated IL-6 production by THP-1 human macrophages by 2.8 and 3.0 fold at 18 and 30 hours post treatment, respectively compared to unloaded MPs (FIG. 11E). IL-6 was undetectable in macrophages not stimulated with IL-1.

Figure 12A:
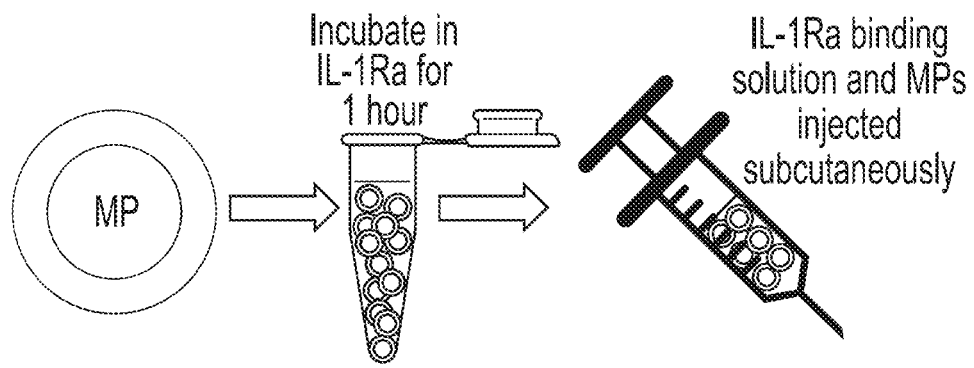
FIGS. 12A-12C depict that IL-Ra MPs increased serum concentration of IL-Ra for 14 days and inhibited IL-1 activity in vivo.
Figure 12B:
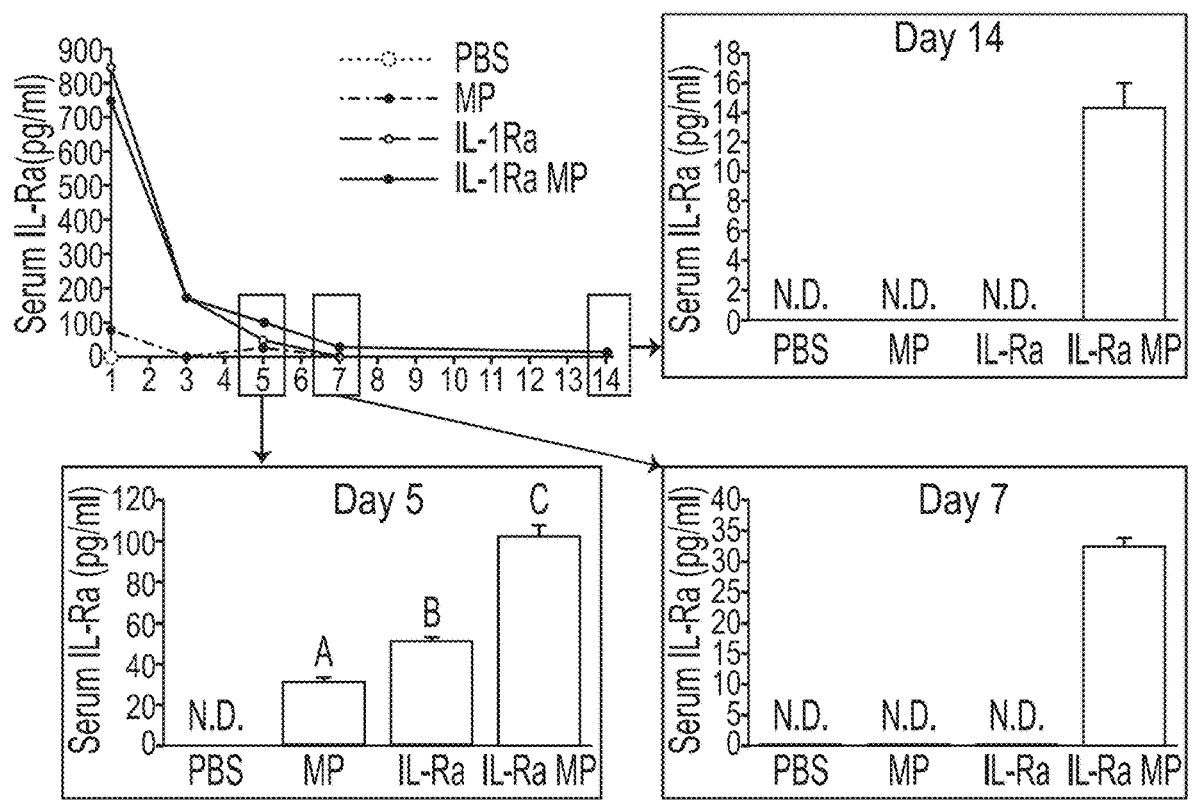

Subcutaneous injection of IL-Ra MPs elevated serum concentrations of IL-Ra for 14 days. Mice received a subcutaneous injection of either IL-Ra MPs suspended in the IL-Ra loading solution (depicted in FIG. 12A), soluble IL-Ra, unloaded MPs in PBS, or PBS and the serum concentration of IL-Ra for each treatment was examined over the course of 14 days (FIG. 12B). Serum IL-Ra was not detected in any animals treated with PBS only at any point during the study while animals treated with IL-Ra MPs or soluble IL-Ra each demonstrated elevated serum levels of IL-Ra 1 day after treatment ($750.4\pm10.8$ pg/ml and $853.3\pm40.37$ pg/ml respectively). The soluble IL-Ra treatment initially elevated serum IL-Ra concentrations, but the IL-Ra levels rapidly decreased over time for 5 days before reaching undetectable levels by day 7. In contrast, serum concentrations of IL-Ra were significantly higher in animals treated with IL-Ra MPs when compared to those treated with soluble IL-Ra 5 days after treatment ($102.9\pm5.3$ pg/ml and $52.1\pm1.1$ pg/ml respectively). Further, IL-Ra was detectable in the serum of animals treated with IL-Ra MPs throughout the 14 days of monitoring after treatment. Interestingly, on 1 day and 5 days after treatment, animals treated with unloaded MPs alone had elevated serum IL-Ra, albeit at significantly lower levels than soluble IL-Ra or IL-Ra MP conditions.

Figure 12C:
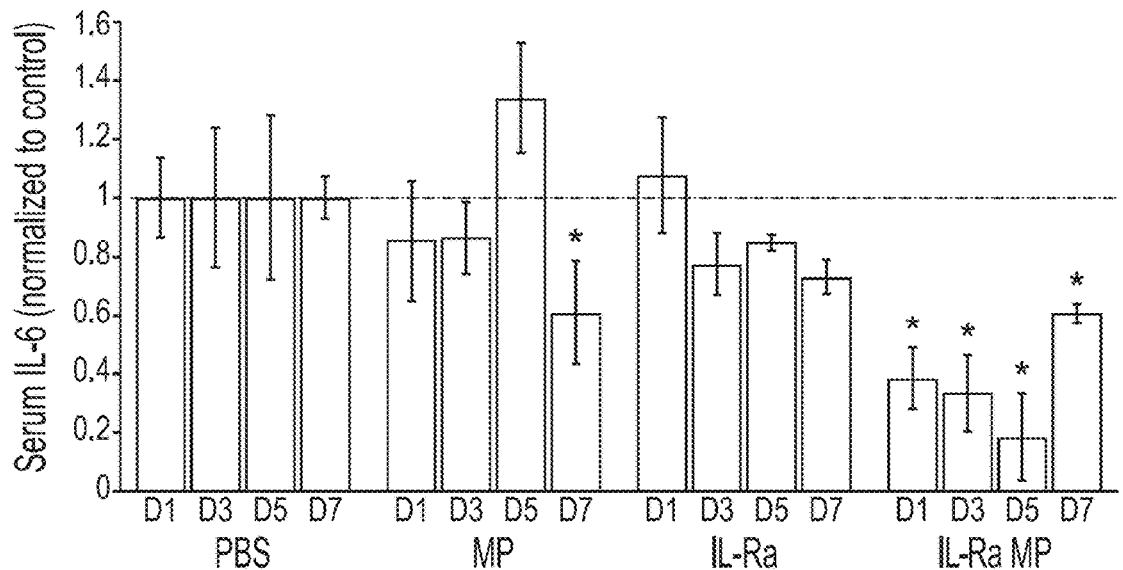

IL-Ra MPs inhibited IL-1 activity in vivo for 7 days. Animals received systemic administration of IL-1 at 1, 3, 5, 7, and 14 days after treatment in order to examine the ability of IL-Ra treatments to inhibit IL-1 activity in vivo. Serum concentration of IL-6, which is elevated in response to IL-1 activity, was examined 2 hours after IL-1 administration and normalized to the PBS treated animals to examine inhibition of IL-1 activity (FIG. 12C). A value lower than 1 indicated inhibition of IL-1 induced IL-6 production. Serum concentration of IL-6 was significantly reduced by $61.8\pm11\%$, $66.7\pm13\%$, and $81.5\pm3\%$ at 1, 3, and 5 days, respectively, after treatment with IL-Ra MPs when compared to PBS treated animals. Soluble IL-Ra or treatment with unloaded MPs did not impact the serum concentration of IL-6 at the same time-points Treatment with MP or IL-Ra MP reduced day 7 IL-6 levels compared to PBS controls. However, there was no statistical difference observed between comparisons of any treatment groups (soluble IL-Ra, unloaded MPs or IL-Ra MPs). By day 14, no significant difference in serum IL-6 was observed between any groups (data not shown).

Figure 13B:
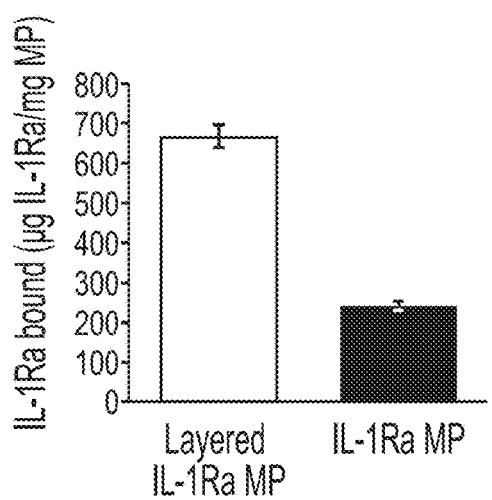
Figure 13C:
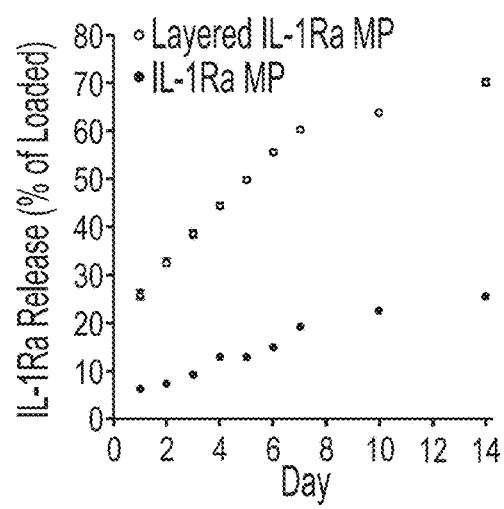
Figure 13D:
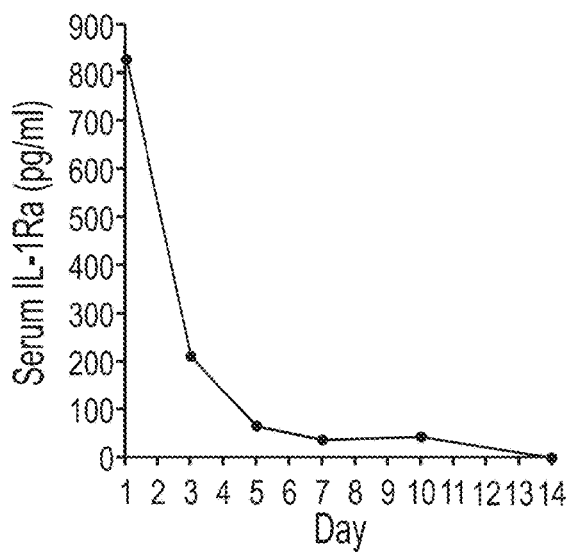
Figure 13E:
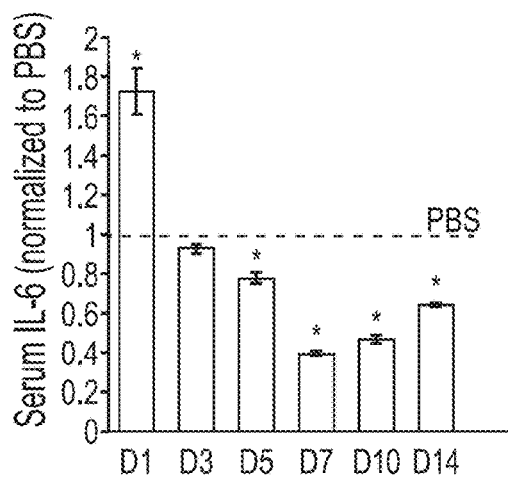

Layering IL-Ra throughout the coating increased the amount of IL-Ra incorporated into the MPs and extended IL-1 inhibition for a longer timeframe in vivo. MPs were incubated in a 1 mg/ml IL-Ra solution for 1 hour each day during the coating process (FIG. 13A) followed by a final 1 hour incubation in 10 mg/ml IL-Ra solution to form the layered IL-Ra MPs. The layered IL-Ra MPs incorporated approximately 3× more IL-Ra ($668.5\pm30.2$ μg IL-Ra/mg MP) than traditionally fabricated IL-Ra MPs ($217.0\pm12.0$ μg IL-Ra/mg MP; FIG. 13B). Moreover, incubation of layered IL-Ra MPs in SBF, resulted in a low burst release of IL-Ra (6.6% of incorporated IL-Ra) after 1 day. Thereafter, IL-Ra released in a sustained manner for at least 14 days in vitro (FIG. 13C). Subcutaneous administration of layered IL-Ra MPs increased the serum concentration of IL-Ra for 10 days, and IL-Ra was not detectable in the serum 14 days after treatment (FIG. 13D). Importantly, animals treated with layered IL-Ra MPs and then stimulated with IL-1 exhibited significantly lower serum concentration of IL-6 than PBS treated controls 5, 7, 10, and 14 days after treatment.

The results provided herein demonstrated that microparticles (MPs) delivered biologically active IL-Ra and successfully inhibited IL-1 activity in vitro and in vivo for longer timeframes than soluble IL-Ra alone. Soluble IL-Ra has a short in vivo half-life of only 4-6 hours and, because IL-1 is a potent inflammatory molecule, IL-Ra concentration must be 100-1000× higher than the concentration of IL-1 in order to inhibit IL-1 activity. Because of these properties, IL-Ra is currently approved for administered as a daily self-administered subcutaneous injection of approximately 1 mg of IL-Ra/kg. While the inhibition of IL-1 has been shown to improve many diseases in case studies and animal models, the use of IL-Ra in clinic has been limited to all but a few clinical scenarios. Sustained delivery of biologically active IL-Ra may expand its clinical uses by maintaining a therapeutic concentration for an extended timeframe, which could improve both the treatment regimen and efficacy of IL-Ra for many diseases.

Unlike polymer encapsulation, IL-Ra MP fabrication does not require a harsh environment or complex process for protein loading. Further, the amount of IL-Ra loaded onto the microparticle can be tailored by altering the concentration of protein in the loading solution. MPs had a substantially higher loading capacity ($21.7\%\pm1.2\%$ IL-Ra w/w of MPs) than previous studies of PLGA microspheres which encapsulated 2.5%-7.5% IL-Ra w/w of PLGA microspheres.

IL-Ra MPs significantly inhibited IL-1 activity in scenarios where an equal dosage of soluble IL-Ra had no effect. IL-Ra MPs inhibited IL-1 induced proliferation of mouse T-lymphocytes even though IL-Ra within the supernatant (as detected by ELISA) was approximately 3-fold lower than the soluble IL-Ra supernatant, which surprisingly had no observable impact on IL-1 induced proliferation.

IL-Ra MPs can deliver active IL-Ra in vivo. IL-Ra MPs were injected subcutaneously along with the IL-Ra binding solution while the soluble IL-Ra treated animals received a subcutaneous IL-Ra injection of equal mass of IL-Ra to ensure animals received the same cumulative dose of IL-Ra. Further, the large bolus dose of IL-Ra from the binding solution may be beneficial for the treatment regimen by providing a high dose of IL-Ra to be scavenged by IL-1 receptors initially, followed by a sustained release of IL-Ra from IL-Ra MPs to maintain receptor occupancy and IL-1 inhibition. While animals were dosed with the same total mass of IL-Ra, after 1 day post treatment, the soluble IL-Ra treated animals had a significantly higher serum concentration of IL-Ra than the IL-Ra treated animals, which may be attributed to the IL-Ra which had not been released from the MPs. IL-Ra MPs significantly increased the serum concentration of IL-Ra at later time points (days 5, 7, and 14) when compared to soluble IL-Ra, indicating that MPs were able to sustainably deliver IL-Ra in vivo. Unexpectedly, IL-Ra was also detectible in animals treated with unloaded MPs 1 and 5 days after treatment. While the IL-Ra ELISA used to detect serum concentration was for human IL-Ra, cross reactivity with endogenous mouse IL-Ra, which shares 80% homology with human IL-Ra, could be responsible for this result. Nevertheless, serum IL-Ra was significantly higher in the IL-Ra MPs than the unloaded MPs at each time point.

Layering IL-Ra throughout the coating improved loading capacity and duration of IL-Ra activity compared to the traditionally loaded IL-Ra MPs and extended the inhibition of IL-1 activity for up to two weeks in vivo. Layering IL-Ra throughout the coating tripled the loading capacity of MPs, lowered the percentage of IL-Ra released on day 1 (burst release), and lowered the percent of IL-Ra released over 14 days, suggesting that layered IL-Ra MPs extends IL-Ra release compared to IL-Ra MPs. Layered IL-Ra MPs also produced higher serum concentrations of IL-Ra than IL-Ra MPs at early time points (day 1 and day 3) but was undetectable on day 14, indicating that layering did not extend the duration of IL-Ra release in vivo. Interestingly, however, layered IL-Ra MPs extended the activity IL-Ra, which may indicate that the higher concentration at earlier time points contributes to extended IL-1 inhibition.

IL-Ra MPs offer a sustained delivery platform for IL-Ra with properties that exceed traditional polymer encapsulation delivery platforms. IL-Ra can be efficiently loaded, sustainably released, and delivered systemically through a subcutaneous injection. Further, the IL-Ra released from IL-Ra MPs was active and could inhibit IL-1 activity. IL-Ra MPs provide a delivery platform that can be administered subcutaneously which extends the time between treatments and improve efficacy in the treatment of IL-1 mediated diseases.

Example 6

In this Example, localized delivery of interleukin-1 Receptor antagonist (IL-Ra) in an injured rat medial collateral ligament (MCL) model was determined.

Microparticles preparation and IL-Ra binding was performed as described above. IL-Ra MPs were created by incubating lyophilized MPs in 25 mg/ml IL-Ra in PBS for 1 hour under continuous rotation at 37° C. in 1.5 ml Protein LoBind Eppendorf tubes. To determine the amount of IL-Ra bound to the MPs, 1 mg of IL-Ra MPs was dissolved in 50 µl of 2N HCl. 20 µl of the dissolved IL-Ra MP sample or IL-Ra standard was mixed with 200 µl of fluoraldehyde o-phthaldialdehyde in a black 96 well plate. Samples were excited at 360 nm and fluorescence was read at 460 nm to quantify protein concentration in solution (n=3).

Animal surgeries were approved by the University of Wisconsin Institutional Animal Care and Use Committee. 36 skeletally mature male Wistar rats (320-340 g) were used as an extra-articular medial collateral ligament (MCL) injury model. Animals were randomly divided into 4 treatment groups, IL-Ra MPs, soluble IL-Ra, unloaded MPs, or PBS. All rats were subjected to a bilateral MCL transection (Day 0) while anesthetized via isofluorane. A 1 cm skin incision was made over the medial aspect of both the left and right stifles. The subcutaneous tissue was dissected to expose the Sartorius muscle and underlying MCL. The axial midpoint of the MCL was completely transected. Either 0.25 mg of IL-Ra MPs suspended in 10 µl of 25 mg/ml IL-Ra, 10 µl of 25 mg/ml IL-Ra, 0.25 mg unloaded MPs in 10 µl PBS, or 10 µl of PBS was pipetted over each of the transected MCLs (n=9 animals per treatment). Animals received the same treatment bi-laterally. Following transection and treatment, the muscular, subcutaneous, and subdermal tissue layers were each closed with 4-0 Dexon suture. All animals were allowed unrestricted cage movement immediately after surgery. Three animals from each treatment condition were sacrificed 7 days post-surgery. The remaining 6 animals per treatment group were sacrificed 14 days post-surgery.

Immediately upon sacrifice on day 7 and day 14 post-surgery, the right MCL was immediately dissected and frozen in liquid nitrogen in Eppendorf tubes and stored at −80C until analysis. Individual MCLs (n=3/condition/timepoint) were placed in Navy Bead Lysis Kit tubes containing 0.9-2.0 mm stainless steel bead blend and 3.2 mm stainless steel balls. 200 µl of Bio-Rad Lysing solution was added and each tube was blended at speed 10 for 5 minutes. The supernatant was collected and transferred to a new Eppendorf tube, subjected to a freeze-thaw cycle, sonicated on ice, centrifuged for 4 minutes at 4,500 g, and the supernatant was again collected. A BCA was run on tissue homogenates to determine protein concentration according to kit instructions. A luminex rat 10-plex multiplex array was utilized to examine the concentration of 10 rat cytokines (IL-1α, IL-1β, IL-2, IL-4, IL-6, IL-10, IL-12, INF-gamma, GM-CSF, and TNF-α) in the MCL tissue homogenates (n=3/condition/timepoint) according to kit instructions. An IL-Ra ELISA (Life Technologies) was run on MCL homogenates (n=3/condition/timepoint) according to kit instructions. All protein concentrations were normalized to protein concentration as measured by the BCA. One way ANOVAs with a Fischer's LSD post hoc analysis were performed using Kaleidograph to assess statistical differences between treatment groups. A p-value≤0.05 was considered significant. A p-value≤0.15 was considered a trend towards significance.

Immediately upon sacrifice on day 7 and day 14 post-surgery, the left MCL of each animal was dissected, measured, flash frozen into Optimal Cutting Temperature (OCT) compound, cut into 5 µm thick cryosections which were mounted on Superfrost Plus microscope slides and maintained at −70° C. for future immunohistochemistry (IHC) and histology. Hematoxylin and eosin (H&E) staining was performed on tissue cryosections to observe the general morphology and granulation tissue size of the healing ligaments. Micrographs of each tissue section were taken using a camera assisted microscope (E6000 Nikon Eclipse microscope equipped with a DP79 Olympus camera) and the granulation tissue dimensions were measured using Image J for 3 tissue sections per animal. Length measurements were taken at the longitudinal midpoint of the ligament. Cross sectional area measurements of the granulation tissue did not include the epiligament tissue. Microparticles were identified in the tissue sections through Alizarin Red staining for calcium detection. Briefly, sections were fixed in cold acetone, stained for 5 minutes with a 40 mM Alizarin Red solution at pH 4.1, rinsed with DI water, dehydrated, coverslipped, and viewed using light microscopy as described above.

Immunohistochemistry (IHC) was performed on cryosections of the MCL specimens to identify specific cell types.

Cell types were characterized using mouse monoclonal antibodies to CD68 (M1 macrophages) and CD3 (T-lymphocytes). These antibodies were obtained from Abcam-Serotec (Raleigh, NC) and were used at a dilution of 1:100. For IHC, cryosections were thawed, fixed in acetone, incubated in 3% hydrogen peroxide to eliminate endogenous peroxidase activity, blocked with background buster (Innovex Biosciences, Richmond, CA) for 30 minutes, and then incubated with the antibody of interest for 2 hours. Following primary antibody incubation and rinsing off unbound antibody, sections were incubated with biotin, followed by incubation in streptavidin-conjugated horseradish peroxidase (Stat Q staining kit from Innovex Biosciences, Richmond, CA). Bound antibodies were visualized with diaminobenzidine (DAB), dehydrated, cleared, and coverslipped for light microscopy. Micrographs of the granulation tissue were taken at 400× for 3 sections of each animal. Positively stained cells were counted in each micrograph for M1 macrophages and T-lymphocytes. Cell counts for 3 sections of the same animal were averaged together and expressed as cells per ligament area. One way ANOVAs with a Fischer's LSD post hoc analysis were performed using Kaleidograph to assess statistical differences between treatment groups. A p-value≤0.05 was considered significant. A p-value≤0.15 was considered a trend towards significance.

Figure 14A:
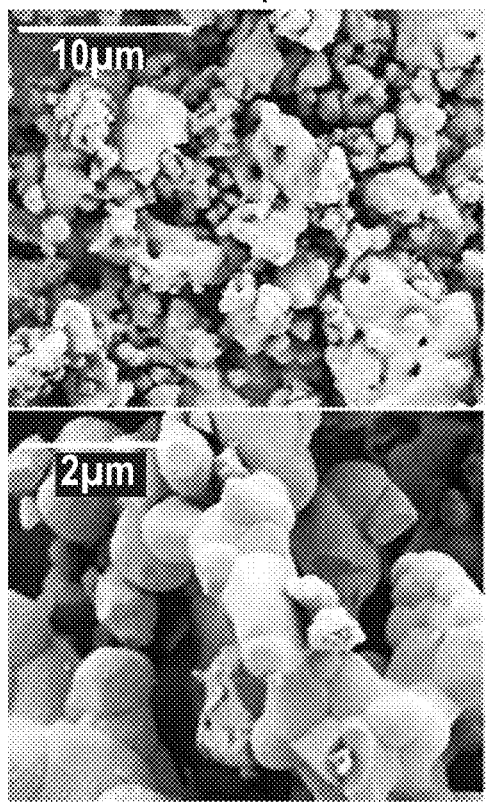
FIGS. 14A-14C depict microparticle coating formation and IL-Ra loading.
Figure 14B:
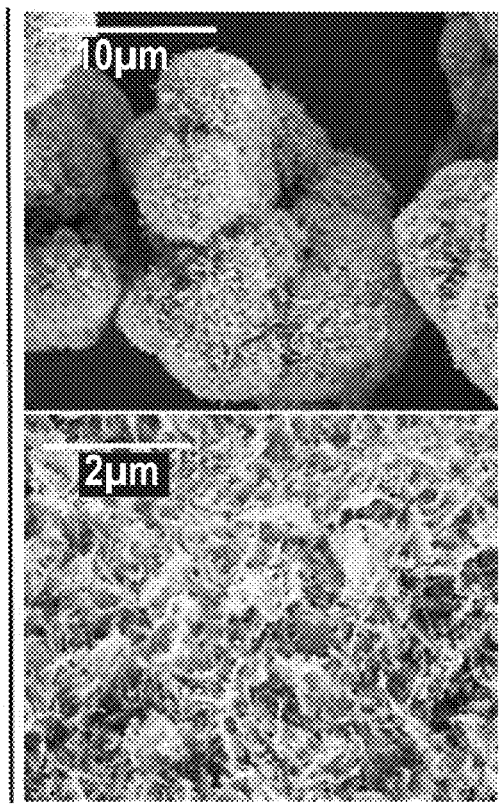
Figure 14C:
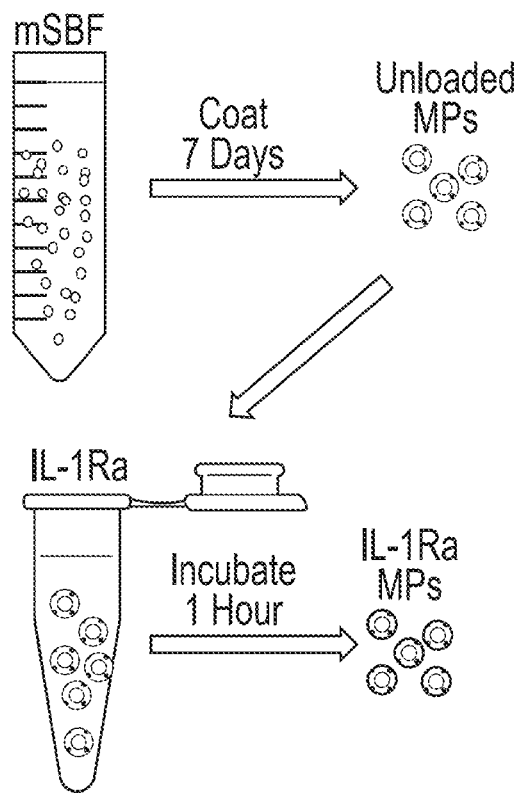

A uniform, nano-porous coating was formed on the surface of the microparticle, and the coated microparticle was able to incorporate IL-Ra via binding in solution. Scanning electron micrographs of the β-TCP microparticles before coating shows a smooth particle surface and sintered appearance (FIG. 14A). After 7 days of incubation in mSBF, microparticles (MPs) had a plate-like, nanoporous structure (FIG. 14B). When incubated in a 25 mg/ml IL-Ra solution, as depicted in FIG. 14C, microparticles bound 104.4±9.8 µg IL-Ra/mg MP.

Figure 15A:
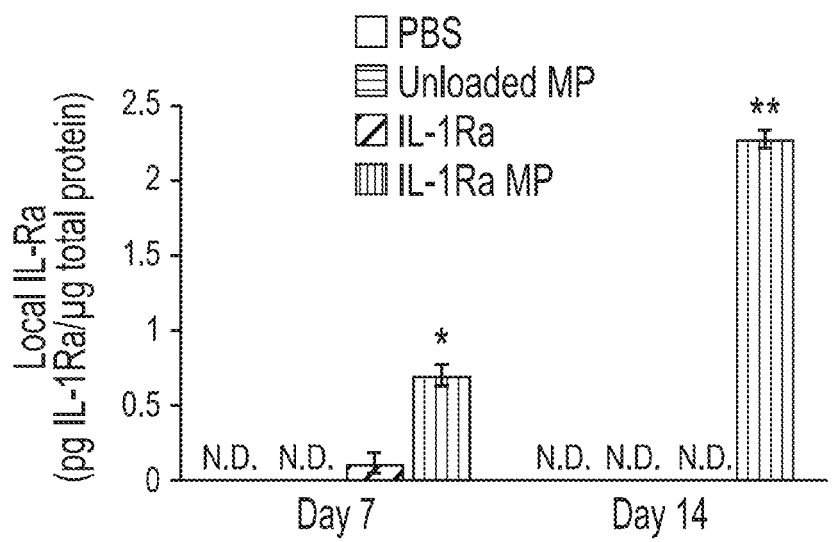
FIGS. 15A-15C depict local delivery of IL-Ra by microparticles.
Figure 15B:
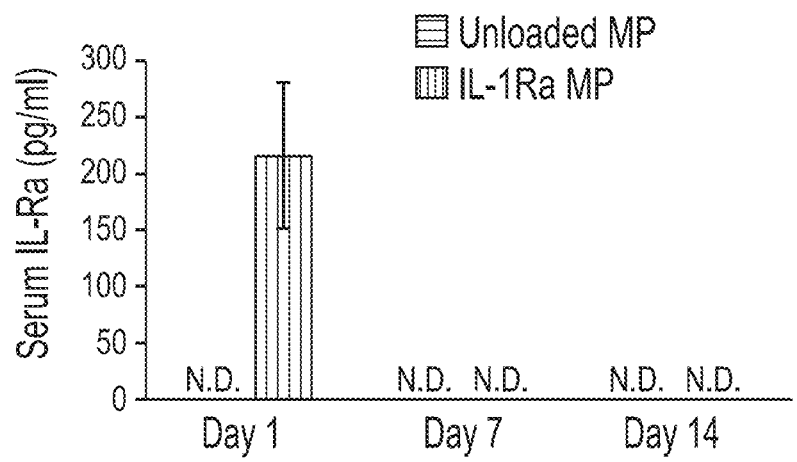
Figure 15C:
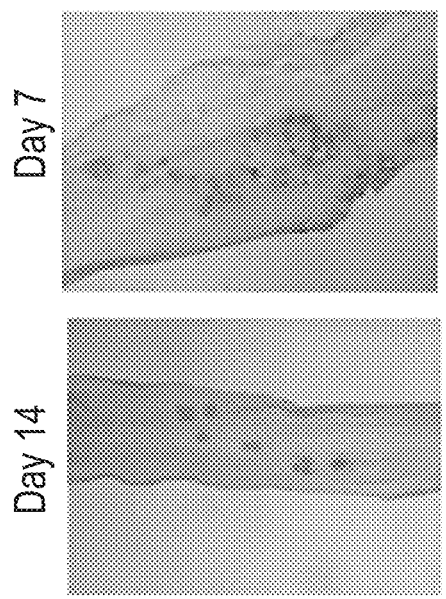

Microparticles successfully elevated local IL-Ra concentration for at least 14 days in a healing rat MCL (FIG. 15). Tissue concentration of IL-Ra was significantly higher in MCLs treated with IL-Ra MPs (0.71±0.07 pg IL-Ra/µg total protein) compared to treatment with soluble IL-Ra (0.12±0.07 pg IL-Ra/µg total protein), unloaded MPs (undetectable), or PBS treated controls (undetectable) 7 days after treatment (FIG. 15A). Further, tissue concentration of IL-Ra 14 days after treatment was significantly higher in IL-Ra MP treated MCLs (2.28±0.06 pg IL-Ra/µg total protein) compared to 7 days after treatment, indicating sustained release from the microparticles for at least 1 week. By day 14 no IL-Ra was detected in the MCL of any animals. Positive Alizarin Red staining for MPs was found in all animals treated with either unloaded MPs or IL-Ra MPs 7 and 14 days after treatment, indicating that MPs remain at the site of injection 14 days after administration (FIG. 15C). To further examine whether IL-Ra remained localized within the tissue when delivered with IL-Ra MPs, the serum concentration of IL-Ra was measured. Serum IL-Ra was significantly elevated 1 day after treatment with IL-Ra MPs (283.33±174.62 pg/ml) compared to unloaded MPs (undetectable; FIG. 15B). However, there was no detectable IL-Ra in the serum of any animal at 7 and 14 days after treatment with IL-Ra MPs.

Figure 16A:
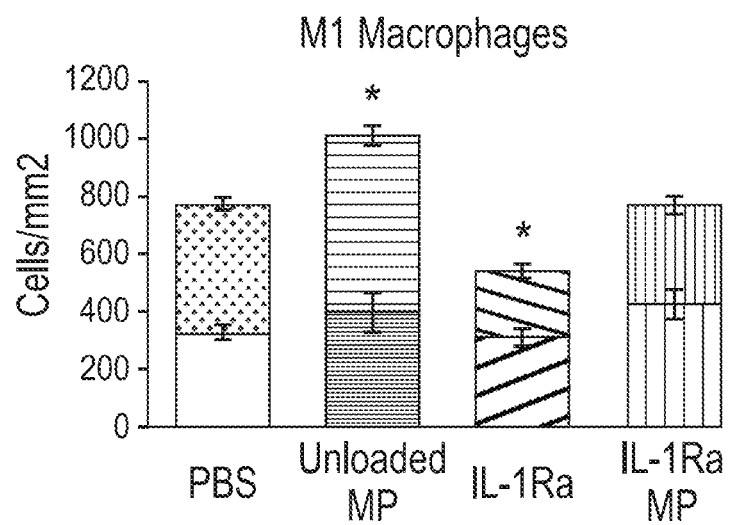
FIGS. 16A-16C depict anti-inflammatory activity of IL-Ra MPs.
Figure 16C:
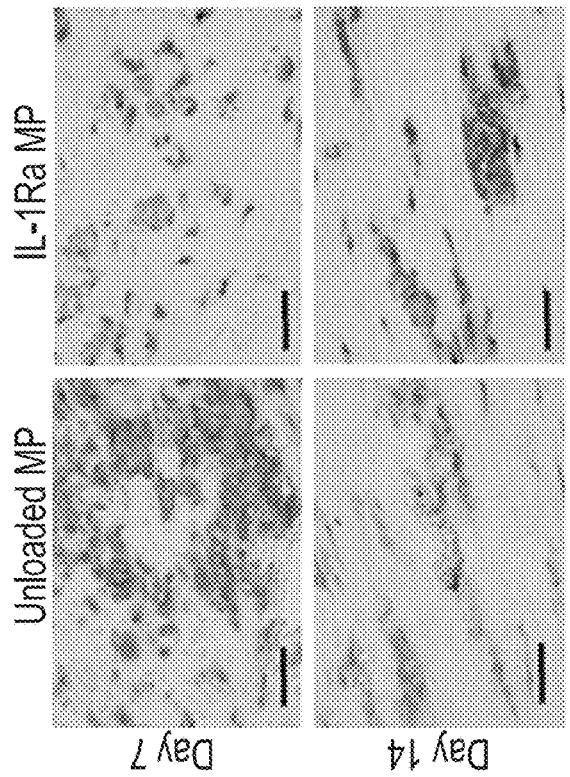
Figure 16B:
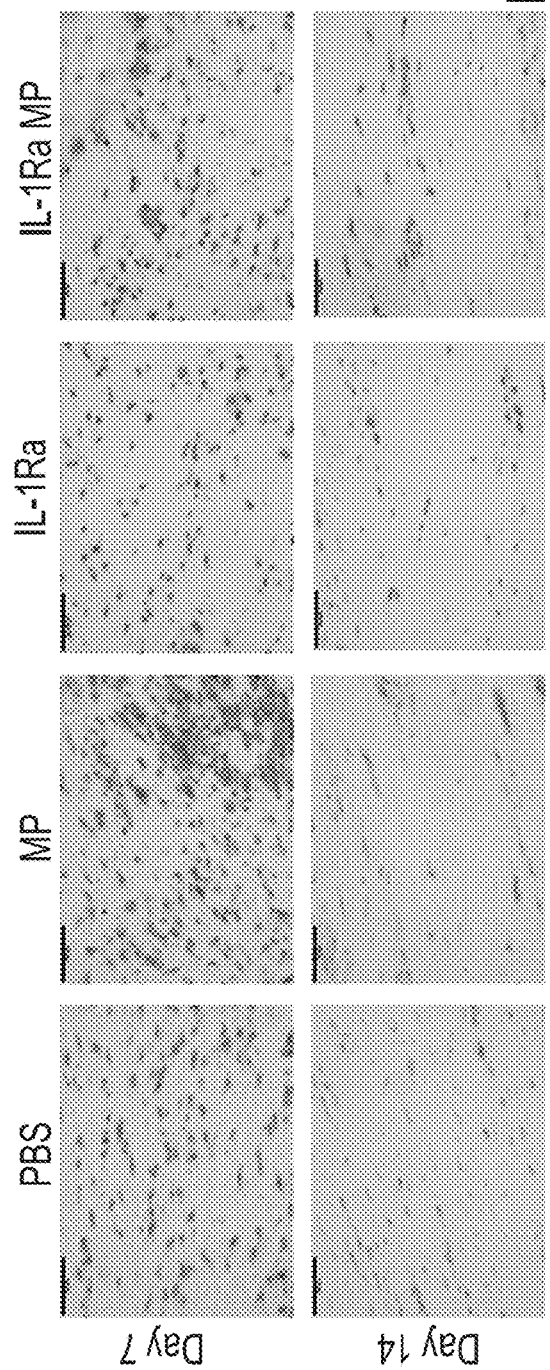

IL-Ra delivered with MPs was biologically active and inhibited inflammatory cell infiltration when compared to unloaded MPs (FIGS. 16A-16C). Pro-inflammatory M1 macrophages were elevated 7 days after injury in animals treated with unloaded MPs when compared to PBS treated controls, as expected after injection of a foreign material. In contrast, M1 macrophage concentration in MCLs treated with IL-Ra loaded MPs were not significantly different than PBS treated animals, indicating IL-Ra release from the MPs was able to inhibit the MP induced infiltration of M1 macrophages. Local administration of soluble IL-Ra alone also decreased M1 macrophage concentration compared to PBS treated animals. By day 14 post treatment, no differences in M1 macrophage concentration were observed between any treatment group.

Figure 17A:
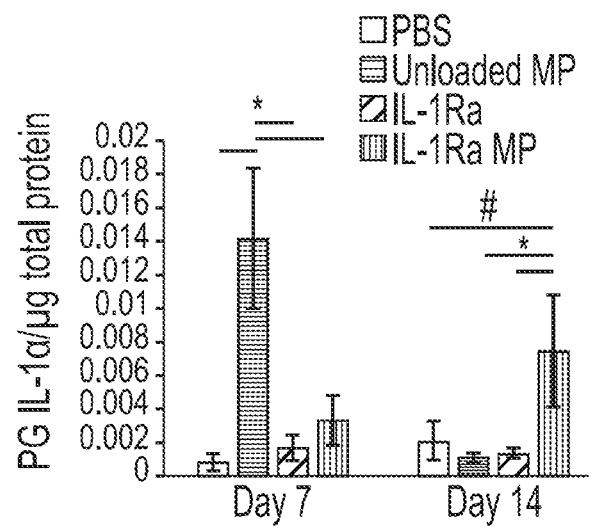
FIGS. 17A & 17B depict local inflammatory protein concentration within the MCL.
Figure 17B:
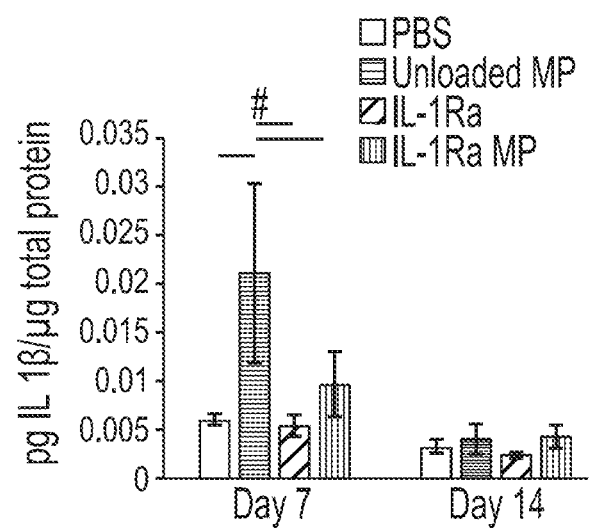

Tissue concentration of both of the pro-inflammatory cytokines IL-1α and IL-1β were higher (p≤0.05 for IL-1α and p≤0.15 for IL-1β for all comparisons) in animals treated with unloaded MPs compared to all other treatment groups 7 days after injury (FIGS. 17A and 17B). In contrast, local IL-1α and β concentrations in IL-Ra MP treated MCLs were not significantly different from those treated with PBS or soluble IL-Ra at 7 days after treatment. By day 14, no significant difference in IL-1β concentration was observed between any treatment group. IL-1α was elevated in animals treated with IL-Ra MPs 14 days after treatment when compared to unloaded MPs (p=0.03), soluble IL-Ra (p=0.04), and PBS (p=0.06) treated animals.

Figure 18A:
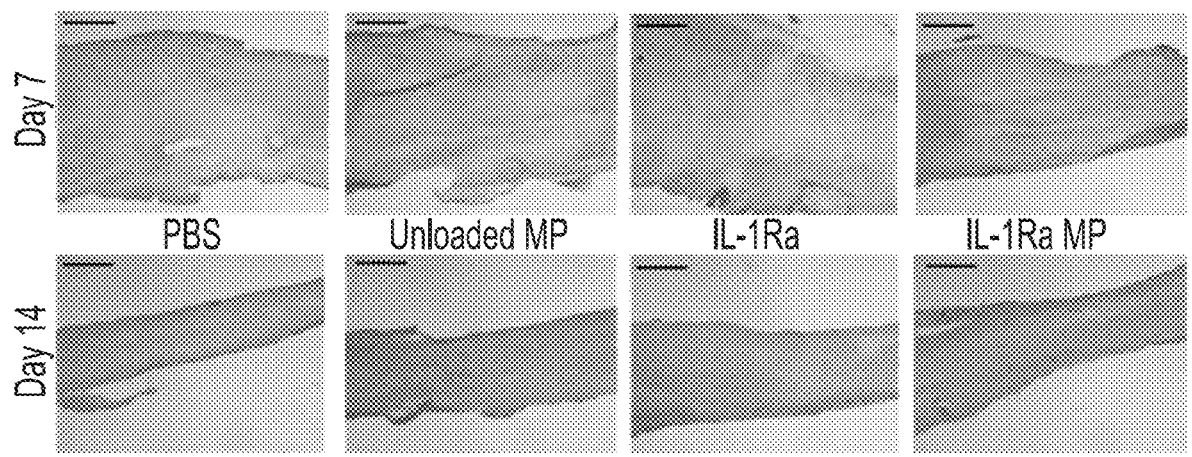
FIGS. 18A-18C depict in vivo response to microparticles.

Microparticles had no impact on granulation tissue formation, did not induce an adaptive immune response compared with soluble IL-Ra, and did not induce a sustained foreign body response within the 2 weeks examination period. H&E staining of tissue sections (FIG. 18A) demonstrate unloaded MPs, soluble IL-Ra, and IL-Ra MPs had no effect on granulation tissue morphology or density and did not impact granulation tissue size. The granulation tissue and the overall MCL area was smaller 14 days after injury compared to 7 days after injury for all treatment groups.

Figure 18C:
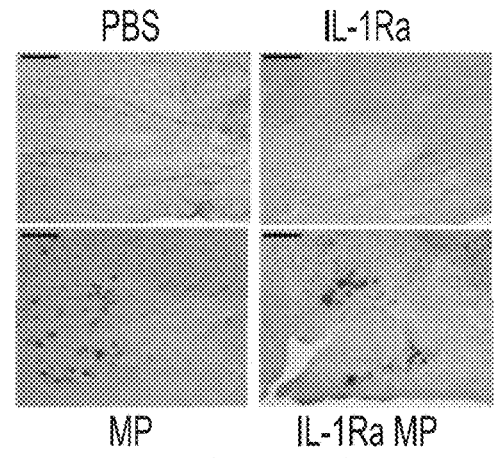
Figure 18B:
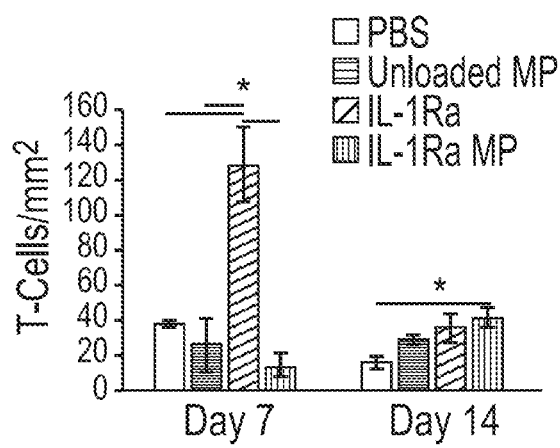

The density of CD+ T-lymphocytes (FIG. 18B) suggests that human IL-Ra may cause an adaptive immune response during rat MCL healing. Treatment with soluble bolus human IL-Ra in the rat MCL significantly increased the T-lymphocyte density within the MCL granulation tissue compared to all other treatment groups 7 days after treatment (FIG. 18B). Interestingly, unloaded MPs and IL-Ra MPs did not have a significant impact on T-lymphocyte density 7 days after treatment. By day 14, the soluble IL-Ra treatment had no effect on T-lymphocytes, however, IL-Ra MPs treatment resulted in significantly more T-lymphocytes compared to PBS treated controls 14 days after treatment.

Microparticles did not induce a detectable sustained foreign body response in a healing rat MCL. H&E staining was used to examine foreign body giant cell and polynucleated cells (PNCs) within the granulation tissue for each treatment (FIG. 18C). While the microparticles are evident in the H&E stained section (dark pink particles), localization of foreign body giant cells and PNCs was not observed. Further, no fibrous encapsulation of the microparticles was observed.

Results presented herein demonstrated that microparticles were able to overcome challenges associated with IL-Ra delivery, including the ability to deliver a high dose (104.98 µg IL-Ra/mg MP), elevate the local concentration of IL-Ra for at least 2 weeks while limiting systemic elevation of IL-Ra, and maintain IL-Ra's anti-inflammatory activity. The results with IL-Ra delivery within a healing ligament demonstrate utility for treatment of numerous local inflammatory injuries and diseases.

IL-Ra MPs were delivered with a bolus, soluble dose of IL-Ra from the binding solution to in order to provide a high initial dose of IL-Ra to be scavenged by IL-1 receptors, followed by a sustained release of IL-Ra from IL-Ra MPs to maintain receptor occupancy. Because the total mass of IL-Ra administered was the same for bolus and sustained release treatment groups, a higher IL-Ra concentration in MCLs treated with IL-Ra MPs demonstrates prolonged delivery of IL-Ra from the MP. Further, the higher concentration in the MCL 14 days after treatment when compared to 7 days after treatment indicates microparticles continue to locally deliver IL-Ra after 7 days in vivo.

In contrast to the local concentration, IL-Ra in the serum was only detectible 1 day after treatment with IL-Ra MPs. Microparticles locally elevated IL-Ra within the tissue without elevating the systemic concentration, which may eliminate off target side-effects often associated with therapeutic protein delivery to treat localized pathologies. Further, microparticles remained localized within the MCL for the duration of the study.

Administration of unloaded microparticles significantly increased the concentration of pro-inflammatory M1 macrophages at 7 days, and co-localization of macrophages to the microparticles was evident (FIG. 16C). When microparticles were loaded with IL-Ra, the increase in macrophages caused by the microparticles themselves was ameliorated and co-localization was not observed, indicating the IL-Ra delivered from the microparticles was active and could locally inhibit inflammation. At the same time, the increase in IL-1α and IL-1β from treatment with unloaded microparticles 7 days after treatment was eliminated when microparticles locally delivered IL-Ra.

Mineral coated microparticles successfully elevated local protein concentration for an extended timeframe when compared to application of the same amount of soluble protein alone. Further, the protein delivered was biologically active. These results demonstrate the utility of MPs to locally deliver active protein in a dynamic tissue while limiting systemic exposure.

The nano-structured calcium phosphate mineral coatings disclosed herein provide a platform for sustained delivery of biologically active agents. The mineral coated microparticles offer an injectable and localized delivery system that can lower the dose and off-target side-effects when compared to bolus injections of active agents, particularly with active agents having short half-lives or having reduced activity when modified such as by encapsulation and/or made into fusion proteins. The formulations and methods disclosed herein advantageously allow for both immediate effect of the active agent that is delivered in its unbound form, as well as sustained effect of the active agent by adsorbing the active agent to mineral coated microparticles that provide sustained delivery of the active agent as the mineral coating degrades and releases the active agent.

Mineral coated microparticles offer a delivery system that can sustainably release therapeutic proteins while maintaining their biological activity. Further, these microparticles remain localized when injected in vivo and offer a localized protein delivery system which can allow for lower therapeutic dosages when compared to systemic subcutaneous or intravenous delivery. Localized delivery of therapeutic proteins can also limit their off target effects. We propose to study the delivery of IL-Ra, a therapeutic protein which is already used in clinic to treat RA, but which requires an onerous treatment regimen which limits its use as a first line therapeutic for RA and other clinical applications where it may be beneficial, such as localized inflammation. We expect delivery of IL-Ra using mineral coated microparticles to be more effective at inhibiting IL-1 induced inflammation than bolus subcutaneous injections of IL-Ra in both systemic and localized situations. Sustained or localized delivery of IL-Ra would provide broader use of this promising anti-inflammatory in many clinical applications.

In view of the above, it will be seen that the several advantages of the disclosure are achieved and other advantageous results attained. As various changes could be made in the above methods without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A formulation for providing an active agent comprising:
    a carrier solution comprising:
        at least a first unbound active agent; and
        a mineral coated microparticle comprising a core and a mineral coating; and at least a second active agent bound to the mineral coated microparticle, wherein the mineral coated microparticle comprises the second active agent in an amount of 11.2 micrograms to 217.5 micrograms second active agent per milligram of microparticle, the first unbound active agent and the second active agent are an IL-1 antagonist, wherein the first unbound active agent and the second active agent are present in the carrier solution in a combined amount of 0.1 mg/ml to 10 mg/ml,
    wherein the first unbound active agent, and the second active agent bound to the mineral coated microparticle are formulated together, and
    wherein the formulation is in unit dose form.

2. The formulation of claim 1, wherein the second bound active agent is adsorbed to the mineral coating.

3. The formulation of claim 1, wherein the second bound active agent is adsorbed to the mineral coating, incorporated within the mineral coating, and combinations thereof.

4. The formulation of claim 1, wherein the first unbound active agent is selected from the group consisting of an IL-1 antagonist; an IL-1F2 antagonist; an IL-1F3 antagonist; an IL-1F4 antagonist; an IL-IFS antagonist; an IL-1F6 antagonist; an IL-1F7 antagonist; an IL-1F8 antagonist; an IL-1F9 antagonist; an IL-IF 10 antagonist; an IL-1F 11 antagonist; an IL-1R antagonist; abatacept; rituximab; tocilizumab; anakinra; adalimumab; etanercept; infliximab; certolizumab; golimumab; and combinations thereof.

5. The formulation of claim 1, wherein the mineral coating comprises calcium, phosphate, carbonate, and combinations thereof.

6. The formulation of claim 1, wherein the mineral coating further comprises a halogen selected from the group consisting of chlorine, bromine, iodine, astatine and combinations thereof.

7. The formulation of claim 1, wherein the mineral coated microparticle comprises a core chosen from polymers, ceramics, metals, glass and combinations thereof.

8. The formulation of claim 1, wherein the second bound active agent is incorporated within the mineral coating.

9. The formulation of claim 1, wherein the mineral coated microparticle comprises a plurality of layers of mineral coating.

10. A method for sustained delivery of active agents, the method comprising: administering the formulation of claim 1.

11. A method for treating an inflammatory disease in a subject in need thereof, the method comprising:
administering a formulation to the subject, wherein the formulation comprises a carrier solution comprising:
at least a first unbound active agent; and
a mineral coated microparticle comprising a mineral coating; and at least a second active agent bound to the mineral coated microparticle, and wherein the mineral coated microparticle comprises the second active agent in an amount of 11.2 microgram to 217.5 micrograms second active agent per milligram of microparticle, the second active agent and the first unbound active agent both being an IL-1 antagonist, wherein the first unbound active agent and the second active agent are present in the carrier solution in a combined amount of 0.1 mg/ml to 10 mg/ml,
wherein the first unbound active agent and the second active agent bound to the mineral coated microparticle are formulated together, and
wherein the formulation is in unit dose form.

12. The method of claim 11, wherein the first unbound active agent is selected from the group consisting of an IL-1 antagonist; an IL-1F2 antagonist; an IL-1F3 antagonist; an IL-1F4 antagonist; an IL-1F5 antagonist; an IL-1F6 antagonist; an IL-1F7 antagonist; an IL-1F8 antagonist; an IL-1F9 antagonist; an IL-1F 10 antagonist; an IL-1F 11 antagonist; an IL-1R antagonist; abatacept; rituximab; tocilizumab; anakinra; adalimumab; etanercept; infliximab; certolizumab; golimumab; and combinations thereof.

13. The method of claim 11, wherein the mineral coating comprises calcium, phosphate, carbonate, and combinations thereof.

14. The method of claim 11, wherein the mineral coating further comprises a halogen.

15. The method of claim 11, wherein the mineral coated microparticle comprises a core chosen from polymers, ceramics, metals, glass and combinations thereof.

16. The method of claim 11, wherein the second bound active agent is adsorbed to the mineral coating, is incorporated within the mineral coating, and combinations thereof.

17. The method of claim 11, wherein the mineral coated microparticle comprises a plurality of layers of mineral coating.

18. A method for treating post-surgery inflammation in a subject in need thereof, the method comprising administering the formulation of claim 1 to the subject.

19. The formulation of claim 1, wherein the microparticle has a binding efficiency of second active agent of from 17% to 90%.

20. The formulation of claim 1, wherein the mineral coated microparticle is coated with two or more mineral coatings.

21. The formulation of claim 20, wherein each mineral coated layer independently comprises an active agent.

* * * * *

UNITED STATES PATENT AND TRADEMARK OFFICE
CERTIFICATE OF CORRECTION

| | | |
|---|---|---|
| PATENT NO. | : 12,465,654 B2 | Page 1 of 1 |
| APPLICATION NO. | : 16/500017 | |
| DATED | : November 11, 2025 | |
| INVENTOR(S) | : William L. Murphy et al. | |

It is certified that error appears in the above-identified patent and that said Letters Patent is hereby corrected as shown below:

In the Specification

Column 12, Line 13, "$50_4^{2-}$" should be --$SO_4^{2-}$--.

Signed and Sealed this
Thirteenth Day of January, 2026

John A. Squires
*Director of the United States Patent and Trademark Office*